(12) United States Patent
Feldmann et al.

(10) Patent No.: US 11,085,484 B2
(45) Date of Patent: Aug. 10, 2021

(54) WATER SEALING SURFACE ATTACHMENT

(71) Applicant: Sunpower Corporation, San Jose, CA (US)

(72) Inventors: Kyle Donald Feldmann, Richmond, IA (US); John Paul Kapla, Mill Valley, CA (US); Bryan Cusick, San Pablo, CA (US)

(73) Assignee: Sunpower Corporation, San Jose, CA (US)

( * ) Notice: Subject to any disclaimer, the term of this patent is extended or adjusted under 35 U.S.C. 154(b) by 958 days.

(21) Appl. No.: 15/713,087

(22) Filed: Sep. 22, 2017

(65) Prior Publication Data

US 2018/0087558 A1 Mar. 29, 2018

Related U.S. Application Data

(60) Provisional application No. 62/399,053, filed on Sep. 23, 2016, provisional application No. 62/507,444, filed on May 17, 2017.

(51) Int. Cl.
*H02S 20/23* (2014.01)
*F16B 43/00* (2006.01)
(Continued)

(52) U.S. Cl.
CPC .......... *F16B 43/001* (2013.01); *F16B 5/0275* (2013.01); *F16B 29/00* (2013.01); *F16B 33/004* (2013.01); *F16B 41/002* (2013.01); *F16J 15/14* (2013.01); *F24S 25/33* (2018.05); *F24S 25/60* (2018.05); *F24S 25/61* (2018.05); *F24S 80/70* (2018.05); *H02S 20/23* (2014.12); *H02S 20/30* (2014.12); *F24S 2025/014* (2018.05); *F24S 2025/021* (2018.05); *F24S 2025/601* (2018.05);
(Continued)

(58) Field of Classification Search
CPC .......... H02S 20/23; H02S 20/24; F24S 25/61; F24S 2025/021; F16B 43/001
See application file for complete search history.

(56) References Cited

U.S. PATENT DOCUMENTS 2,666,354 A * 1/1954 Dim ...................... F16B 43/001
411/371.1
5,281,065 A * 1/1994 Wu ........................ F16J 15/064
411/258
(Continued)

FOREIGN PATENT DOCUMENTS

JP 3163225 * 5/2001 ............... E04D 1/30
JP 2011-226095 * 11/2011 ............... E04B 1/41

*Primary Examiner* — Michael P Ferguson
(74) *Attorney, Agent, or Firm* — Oblon, McClelland, Maier & Neustadt, L.L.P.

(57) ABSTRACT

A mounting assembly for securing fixtures to a mounting structure may include a first fastener, a washer, a mounting bracket, and second fastener. The first fastener may be coupled to the mounting structure through a mounting aperture. The washer may be disposed around shaft of the first fastener between a head of the first fastener and the mounting surface. The mounting bracket may be disposed on top of the first fastener. The second fastener may be disposed through the mounting bracket and coupled to head of the first fastener. The washer may be a sealing washer that dispenses liquid sealant under compressive force to moisture-proof the securement of the first fastener to the mounting surface.

16 Claims, 17 Drawing Sheets

(51) Int. Cl.
*F16B 29/00* (2006.01)
*F24S 25/60* (2018.01)
*F24S 25/33* (2018.01)
*H02S 20/30* (2014.01)
*F24S 80/70* (2018.01)
*F16J 15/14* (2006.01)
*F24S 25/61* (2018.01)
*F16B 33/00* (2006.01)
*F16B 41/00* (2006.01)
*F16B 5/02* (2006.01)
*F24S 25/00* (2018.01)

(52) U.S. Cl.
CPC ....... *F24S 2025/6005* (2018.05); *Y02B 10/10* (2013.01); *Y02E 10/47* (2013.01)

(56) References Cited

U.S. PATENT DOCUMENTS

| | | | |
|---|---|---|---|
| 8,136,311 B2 * | 3/2012 | Liu | F24S 25/30 52/173.3 |
| 8,683,751 B2 * | 4/2014 | Stearns | E04D 13/10 52/58 |
| 10,277,162 B1 * | 4/2019 | Atia | F24S 25/636 |
| 2016/0248367 A1 | 8/2016 | Almy et al. | |
| 2016/0248369 A1 | 8/2016 | Almy | |

* cited by examiner

WATER SEALING SURFACE ATTACHMENT

CROSS-REFERENCE TO RELATION APPLICATION

This application claims the benefit of U.S. Provisional Application No. 62/399,053, filed Sep. 23, 2016, and U.S. Provisional Application No. 62/507,444, filed May 17, 2017, which are herein incorporated by reference in their entirety.

BACKGROUND

Solar power has long been viewed as an important alternative energy source. To this end, substantial efforts and investments have been made to develop and improve upon solar energy collection technology. Of particular interest are residential-, industrial- and commercial-type applications in which relatively significant amounts of solar energy can be collected and utilized in supplementing or satisfying power needs. One way of implementing solar energy collection technology is by assembling an array of multiple solar modules.

One type of solar energy system is a solar photovoltaic system. Solar photovoltaic systems ("photovoltaic systems") can employ solar panels made of silicon or other materials (e.g., III-V cells such as GaAs) to convert sunlight into electricity. Photovoltaic systems typically include a plurality of photovoltaic (PV) modules interconnected with wiring to one or more appropriate electrical components (e.g., switches, inverters, junction boxes, etc.).

A typical conventional PV module includes a PV laminate or panel having an assembly of crystalline or amorphous semiconductor devices ("PV cells") electrically interconnected and encapsulated within a weather-proof barrier. One or more electrical conductors are housed inside the PV laminate through which the solar-generated current is conducted.

Regardless of an exact construction of the PV laminate, most PV applications entail placing an array of solar modules at the installation site in a location where sunlight is readily present. This is especially true for residential, commercial, or industrial applications in which multiple solar modules are desirable for generating substantial amounts of energy, with the rooftop of the structure providing a convenient mounting surface at which the solar modules can be placed. For many such mounting surfaces, though, it is of utmost importance to maintain a moisture barrier to prevent precipitation or other water from penetrating the mounting surface. However, many mounting systems require penetrating the mounting surface to engage with the superstructure of the roof, which might weaken the moisture barrier. Accordingly, there remains a continuing need for improved systems and methods for mounting fixtures to mounting surfaces securely while also ensuring a sufficient moisture barrier.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

SUMMARY

Figure 1:
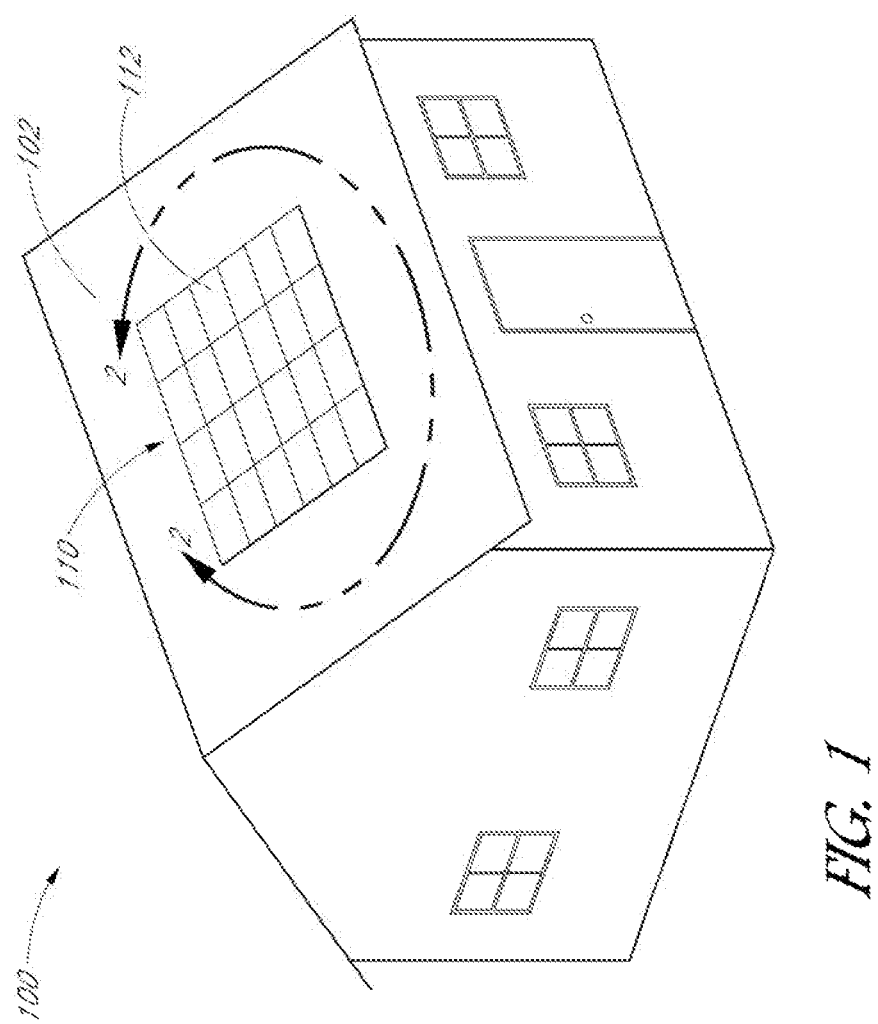
FIG. 1 is a schematic perspective view of a solar power system comprising an array of solar modules mounted to a support structure.

In one embodiment, a mounting assembly coupled to a mounting surface having a mounting aperture is disclosed. The mounting assembly can include a first fastener comprising a first head comprising an upper side and a lower side, the upper side of the head having one or more surfaces that define a connector portion. The first fastener can include a first shaft extending from the lower side of the first head into the mounting aperture of the mounting surface. A sealing washer can be disposed around the first shaft of the first fastener between the mounting surface and the lower side of the first head of the first fastener. The sealing washer can define one or more chambers adapted to contain a sealant. The one or more chambers can comprise a frangible dispensing portion configured to rupture when a pressure of the sealant in the chamber exceeds a threshold. The frangible dispensing portion can be configured to direct the sealant toward the first shaft of the first fastener upon rupture. The mounting assembly can include a second fastener engaging the connector portion of the first fastener. The second fastener can comprise a second head comprising an upper side and a lower side, and a second shaft extending from the lower side of the second head into the connector portion of the first head of the first fastener to secure the second fastener relative to the first fastener. A mounting bracket can be disposed between the first head of the first fastener and the second head of the second fastener such that the second shaft of the second fastener extends through an opening in the mounting bracket.

In some embodiments, a method for installing a mounting assembly on a mounting surface is disclosed. The method can include forming a mounting aperture into the mounting surface. The method can include providing a first fastener having a first head and a first shaft. The method can include providing a sealing washer having a central opening and defining one or more chambers containing sealant. The one or more chambers can include a frangible dispensing portion configured to rupture when a pressure of the sealant in the chamber exceeds a threshold. The frangible dispensing portion can be configured to direct the sealant toward the central opening upon rupture. The method can include installing the first shaft of the first fastener through the central opening of sealing washer and into the mounting aperture. The method can include rupturing one or more of the one or more chambers and dispensing sealant towards the first shaft of the first fastener. The method can include placing a mounting bracket having an opening on top of the first head of the first fastener. The method can include providing a second fastener having a second head and a second shaft. The method can include installing the second shaft of the second fastener through the opening. The method can include securing the second shaft of the second fastener relative to the first fastener.

In some embodiments, an apparatus is disclosed. The apparatus can include a washer comprising an annular body having a central opening and defining one or more chambers around the central opening, the one or more chambers containing a sealant. The annular body can have one or more dispensing portions that are weaker than other portions of the annular body. The one or more dispensing portions can be disposed on an inner surface of the annular body such that, when a pressure of the sealant in the one or more chambers exceeds a threshold, the one or more dispensing portions are configured to rupture before the other portions to direct sealant from the one or more chambers toward the central opening.

In some embodiments, a mounting assembly coupled to a mounting surface having a mounting aperture is disclosed. The mounting assembly can include a first fastener comprising a first head and a first shaft extending from the first head into the mounting aperture of the mounting surface. A sealing washer can be disposed around the first shaft of the first fastener between the mounting surface and the first head of the first fastener. The sealing washer can define one or more chambers adapted to contain a sealant. The one or more chambers can comprise a frangible dispensing portion configured to rupture when a pressure of the sealant in the one or more chambers exceeds a threshold. The frangible dispensing portion can be configured to direct the sealant toward the first shaft of the first fastener upon rupture. A mounting bracket can comprise an opening through which the first shaft extends.

In some embodiments, a mounting assembly coupled to a mounting surface having a mounting aperture is disclosed. The mounting assembly can include a first fastener comprising a first head comprising an upper side and a lower side, the upper side of the head having one or more surfaces that define a connector portion. The first fastener can include a first shaft extending from the lower side of the first head into the mounting aperture of the mounting surface. The mounting assembly can include a second fastener engaging the connector portion of the first fastener. The second faster can include a second head comprising an upper side and a lower side. A second shaft can extend from the lower side of the second head into the connector portion of the first head of the first fastener to secure the second fastener relative to the first fastener. A mounting bracket can be disposed between the first head of the first fastener and the second head of the second fastener such that the second shaft of the second fastener extends through an opening in the mounting bracket.

DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or contest for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" solar module does not necessarily imply that this solar module is the first solar module in a sequence; instead the term "first" is used to differentiate this solar module from another solar module (e.g., a "second" solar module).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

Figure 2:
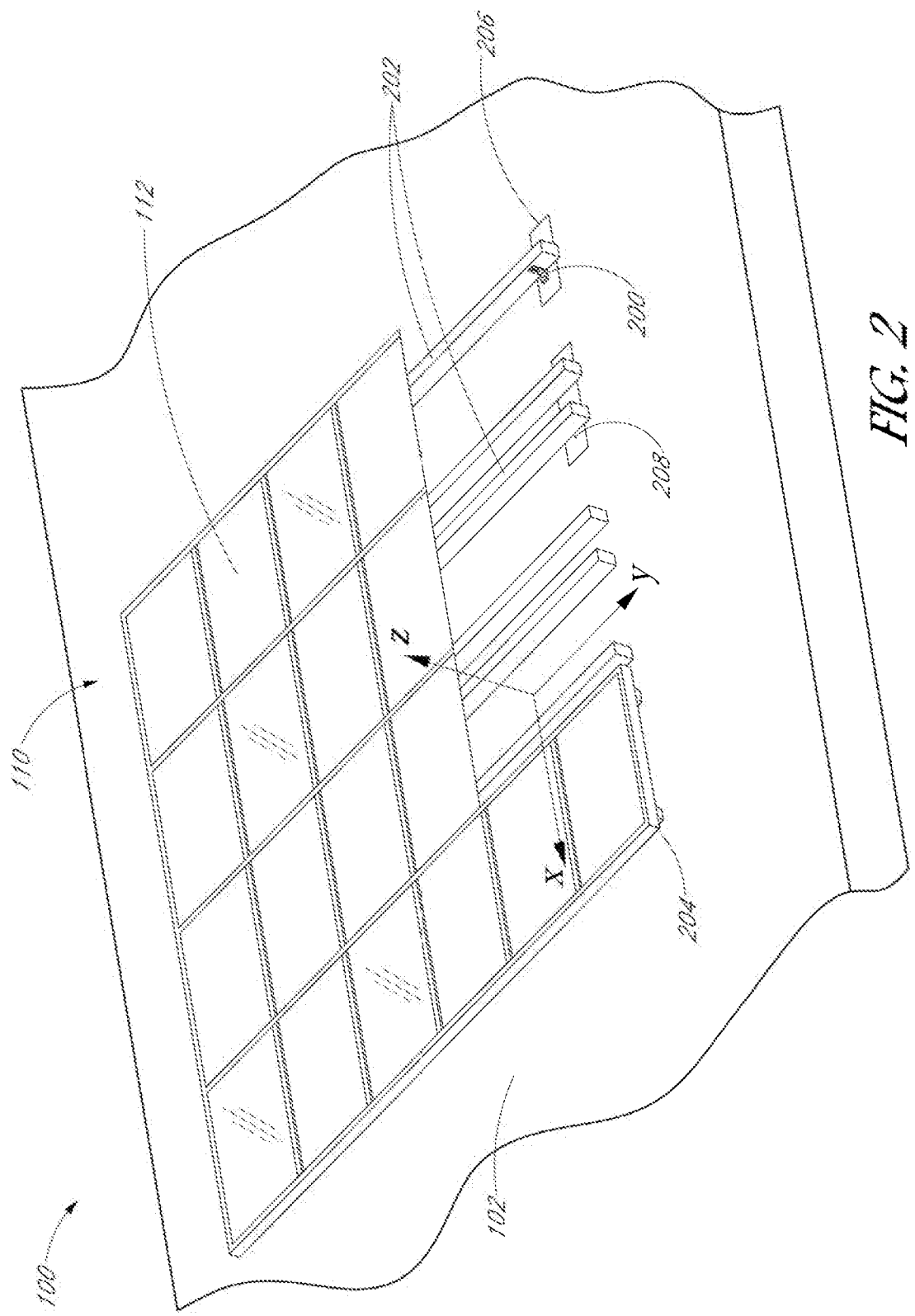
FIG. 2 is a magnified perspective view of the solar power system illustrated in FIG. 1.

FIG. 1 is a schematic perspective view of a solar power system 100 comprising an array 110 of solar modules 112 mounted to a mounting surface 102. FIG. 2 is a magnified perspective view of the solar power system 100 illustrated in FIG. 1. The system 100 of FIGS. 1-2 is illustrated as being coupled to a mounting surface 102 that comprises a roof of a building, such as a residential, commercial, industrial structure, etc. There may be a superstructure under the mounting structure 102 providing support to the mounting structure 102, and which may be used to secure attachments to the mounting structure 102. For example, a plurality of rafters may support a mounting surface 102 such as the roof of a building. Additionally, the mounting surface 102 may have an interlocking layer of shingles (e.g., tile shingles, composite shingles, wooden shingles) disposed on top. Additionally or alternatively, the mounting surface 102 may also include a corrugated metal (e.g., steel) roof.

The solar module 112 can include a photovoltaic (PV) laminate or panel having an assembly of crystalline or amorphous semiconductor devices ("PV cells") electrically interconnected and encapsulated within a weather-proof barrier that includes a frame 204. The solar modules 112 can be mounted on and coupled to spaced apart rails 202 that extend across the mounting surface 102. The rails 202 and frame 204 may comprise any of a number of suitable materials including aluminum, steel, or stainless steel. Either or both of the rails 202 and frame 204 may be anodized, painted, or otherwise coated with one or more layers to protect against corrosion, wear, etc. One or more flashings 206 may be disposed on top of the mounting surface 102, and the one or more flashings 206 may define a mounting aperture 208 through each flashing 206 and into the mounting surface 102. As discussed herein the rails 202 may mechanically couple to the mounting surface 102 by way of a mounting assembly 200 partially disposed on top of the flashing 206 and partially disposed through the mounting aperture 208. Each flashing 206 may comprise metal, polymer, or composite. It will be understood that each flashing 206 may be used to help waterproof a mounting structure 102 and prevent moisture (e.g., precipitation, ocean spray, etc.) from penetrating the mounting structure 102 through the one or more mounting apertures 208. The type of flashing 206 may depend in part on the type of mounting surface 102. For example, the flashing 206 may be a first type of flashing for use with a composite tile roof if the mounting surface 102 includes composite tiles, but the flashing 206 may be a second type of flashing for use with corrugated metal roofs if the mounting surface 102 includes a corrugated metal roof. Alternatively, depending on the mounting surface, the mounting assembly may be installed directly on the mounting assembly without a flashing 206.

As shown in FIG. 2, a global x-y-z coordinate system can be defined across the mounting surface 102. For example, the rails 202 can extend along a length in the y-direction, and the array 110 can be positioned atop the rails 202 in the x-y plane. As used herein, the x-y-z coordinate system shown in FIG. 2 defines a global frame of reference for the solar modules 112 and other components disclosed herein. The solar modules 112 may be secured to the rails 202 by one or more clamps. It will be understood, however, that additionally or alternatively to a solar power system 100, the mounting assembly 200 disclosed herein may be used to secure any of a number of other fixtures to a mounting surface including but not limited to air conditioners, swamp coolers, solar water heaters, signs, lighting, antenna, etc.

Figure 3:
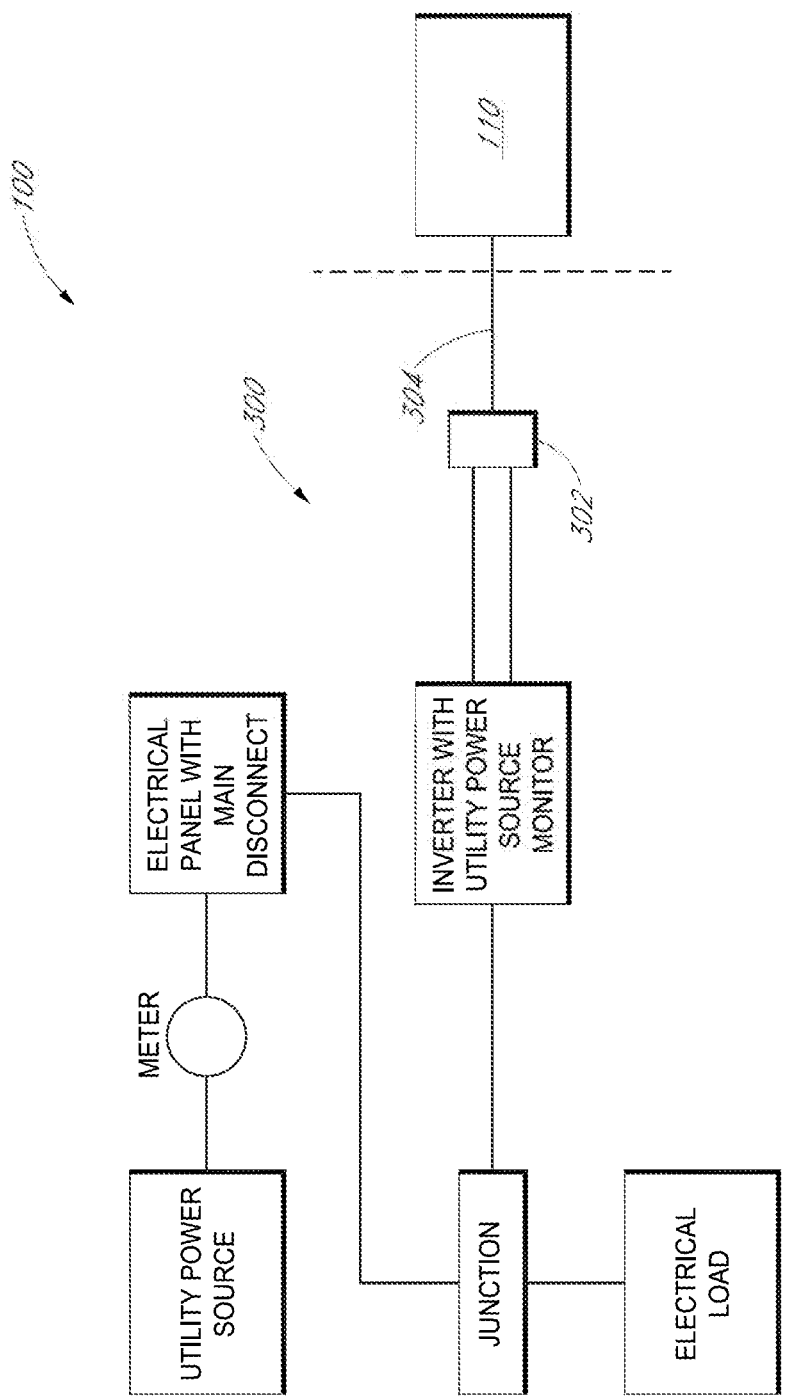
FIG. 3 is a schematic diagram of an optional electrical system connected to the array.

FIG. 3 is a schematic diagram of an optional electrical system 300 connected to the array. The solar power system 100 can be incorporated into the electrical system 300 connected to the array 110. For example, the electrical system 300 can include the array 110 as a power source connected to a remote connection device 302 with power lines 304. The electrical system 300 can also include a utility power source, a meter, an electrical panel with a main disconnect, a junction, electrical loads, and/or an inverter with the utility power source monitor.

Mounting Assembly 200A and Sealing Washer 410—FIGS. 4-7

Figure 4A:
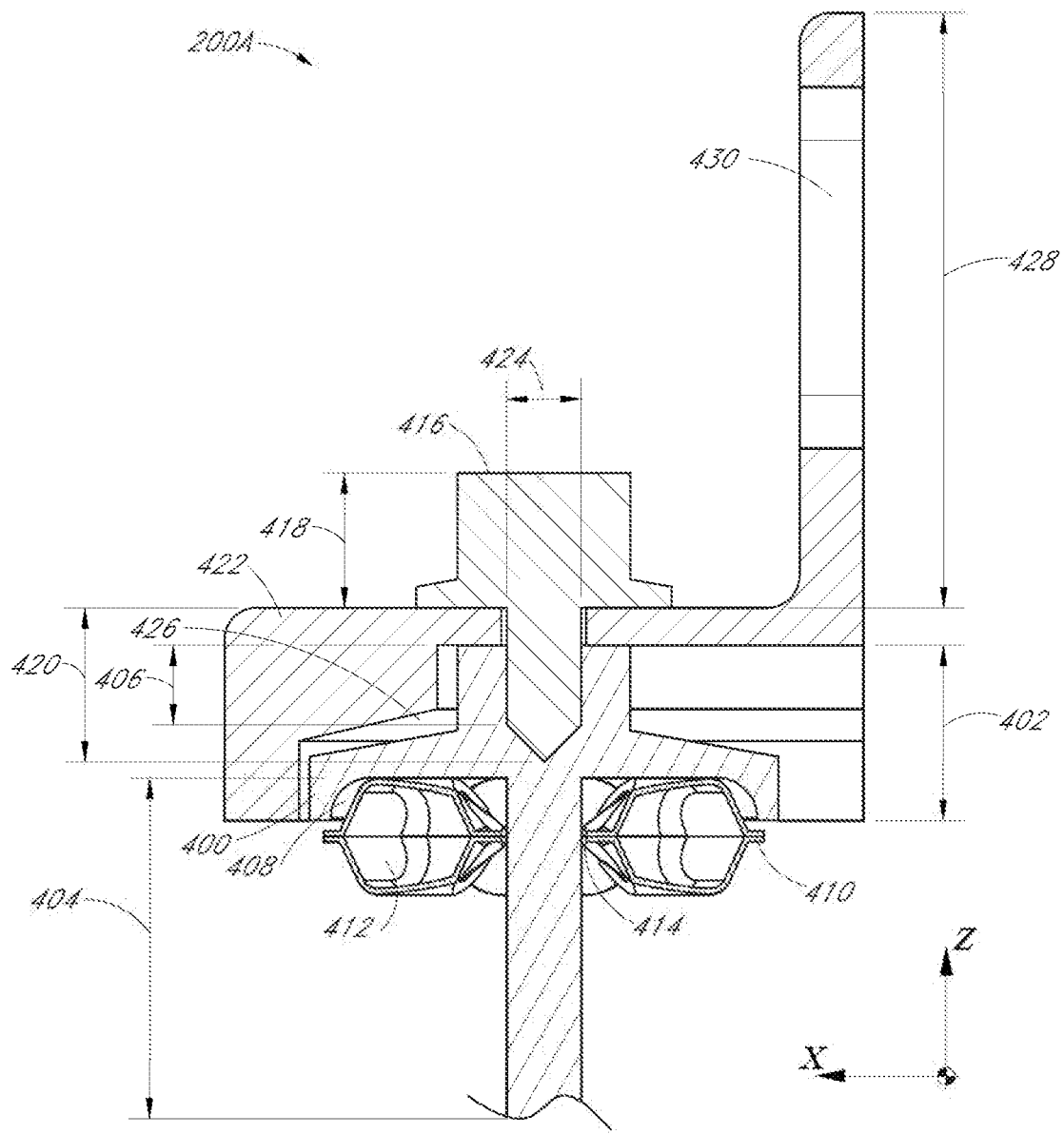
FIG. 4A is an assembled side view of a mounting assembly, according to various embodiments.
Figure 4B:
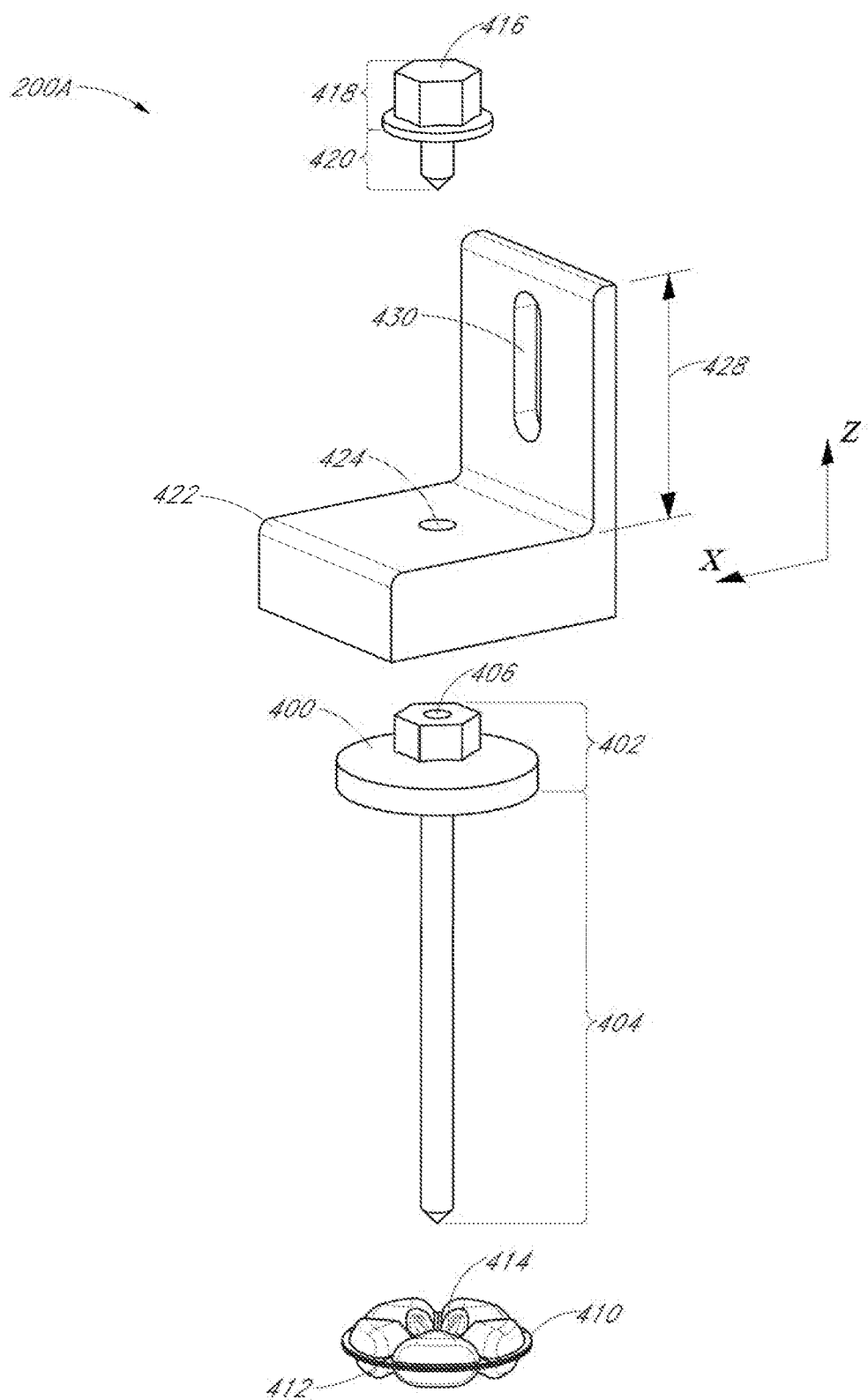
FIG. 4B is an exploded perspective view of the mounting assembly of FIG. 4A.
Figure 5:
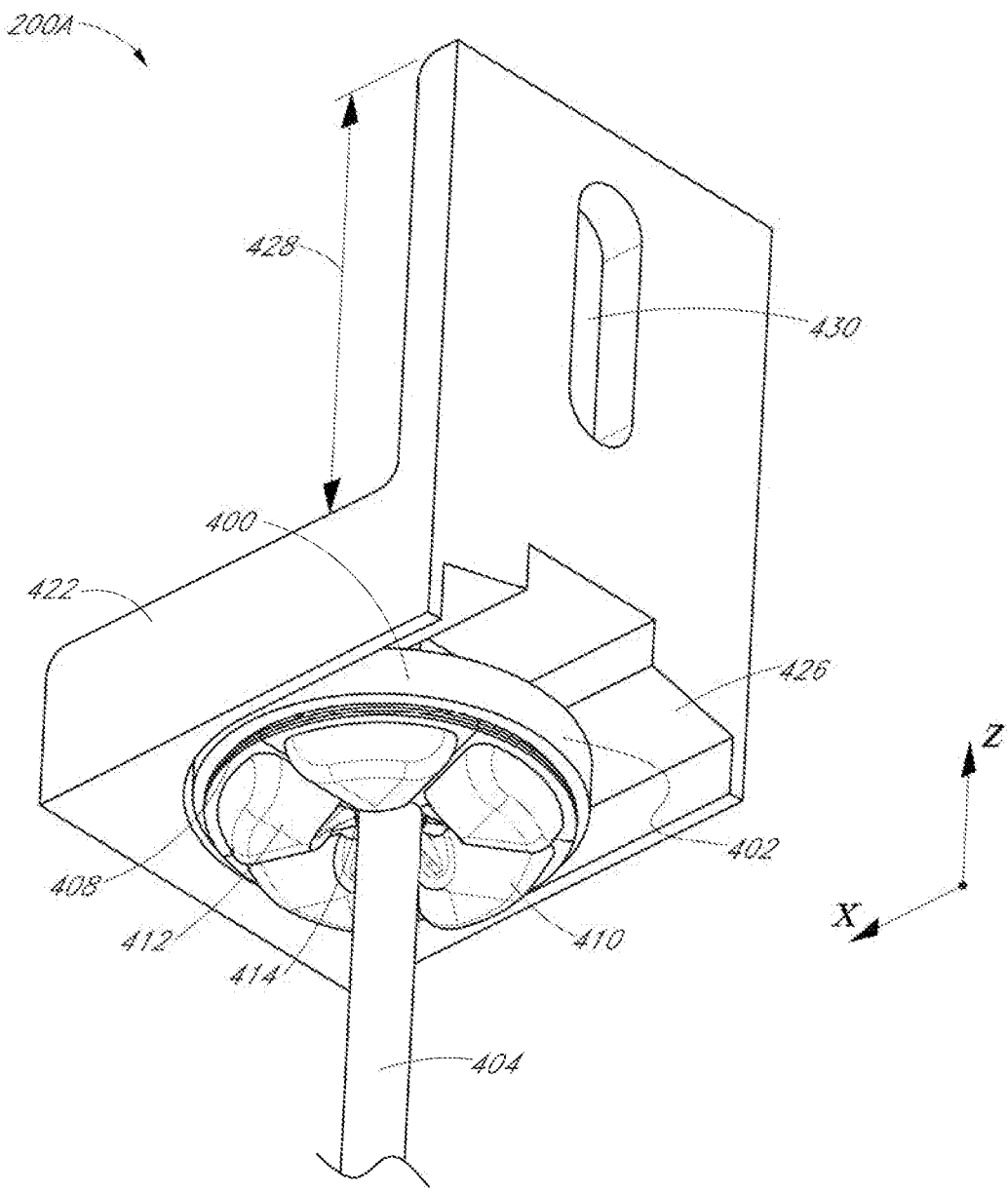
FIG. 5 is an assembled perspective view of the underside of the mounting assembly of FIG. 4A.

FIG. 4A shows an assembled side-view of a mounting assembly 200A. FIG. 4B shows an exploded perspective view of a mounting assembly 200A. FIG. 5 shows an assembled perspective view of the underside of a mounting assembly 200A.

The mounting assembly 200A includes a first fastener 400, a sealing washer 410, a second fastener 416, and a mounting bracket 422. The mounting assembly 200A may be partially disposed through a mounting aperture 208 and partially disposed on top of a flashing 206 (see FIG. 2). A mounting assembly 200A and flashing 206 may be disposed on top of a mounting surface 102 as discussed herein. The first fastener 400, second fastener 416, and mounting bracket 822 may comprise metal (e.g., steel) and the sealing washer 410 may comprise a polymer.

The first fastener 400 may include a head 402 and a shaft 404. The head 402 may include a connector portion 406 and a cavity 408. The shaft 404 may be disposed through the flashing 206 into the mounting aperture 208 and into the mounting surface 102 (e.g., the underlying roof structure of a building). The shall 404 may include one or more surfaces configured to engage with the mounting surface 102 (e.g., a screw). The head 402 may include an upper side and a lower side. The upper side of the head 402 may include one or more surfaces that define a non-circular profile configured to be engaged by a corresponding profile of a tool to drive the first fastener 400 into the mounting aperture 208 and secure the first fastener 400 relative to the mounting surface 102 (e.g., the head 404 may be a hex head that be engaged by a wrench). The connector portion 406 of the head 402 may be disposed on the upper side of the head 402 and into the top of the bead 402. The connector portion 406 may include one or more surfaces configured to engage with a second fastener 416 (e.g., the connector portion 406 may comprise an internally threaded surface configured to engage a screw). The lower side of the head 402 may include a cavity 408 configured to accept an annular washer (e.g., a sealing washer 410). When the first fastener 400 is engaged with the mounting surface 102, the head 402 may exert downward pressure on the annular washer and compress it causing a dispensing portion 414 of the sealing washer 410 to rupture and dispense sealant around the shaft 404 as discussed herein. The dispensing portion 414 can comprise a frangible portion of the sealing washer 410 along an inner surface of the washer 410. For example, in some embodiments, the frangible dispensing portion 414 can comprise a wall thickness thinner than other portions of the sealing washer 410 and/or a material selected such that the frangible dispensing portion 414 breaks or ruptures before the other portions. In some embodiments, the frangible dispensing portion 414 can be perforated or otherwise more easily breakable than the other portions of the washer 410. For example, the first fastener 408 may be a lag screw with an internally threaded hexagonal head including a cavity configured to accept a sealing washer 410 and compress it against the flashing 206 as discussed herein.

Mounting bracket 422 may include an opening 424, cavity 426, and vertical member 428. Mounting bracket 422 may be disposed on top of the first fastener 400 to accept the head 402 of the first fastener 400 into the cavity 426. The opening 424 may expose the connector portion 406 of the head 402 of the first fastener 400. Vertical member 428 may include an aperture 430. The aperture 430 may accept a fastener (not shown) and be used to couple to a fixture (e.g., a rail 202).

The second fastener 416 may include a head 418 and a shaft 420. The shaft 420 may be disposed through the opening 424 of the mounting bracket 422. The head 418 may be disposed on top of the mounting brackets 422. The shaft 420 may include one or more surfaces configured to engage with the connector portion 406 of the first fastener 400. The head 418 may include an upper side and a lower side with the shaft 420 extending from the lower side of the head 418. The upper side of the head 418 of the second fastener 416 may include one or more surfaces that define a non-circular profile configured to be engaged by corresponding profile of a tool to drive the second fastener 416. For example, the second fastener may be a machine screw with a hex head.

Figure 6:
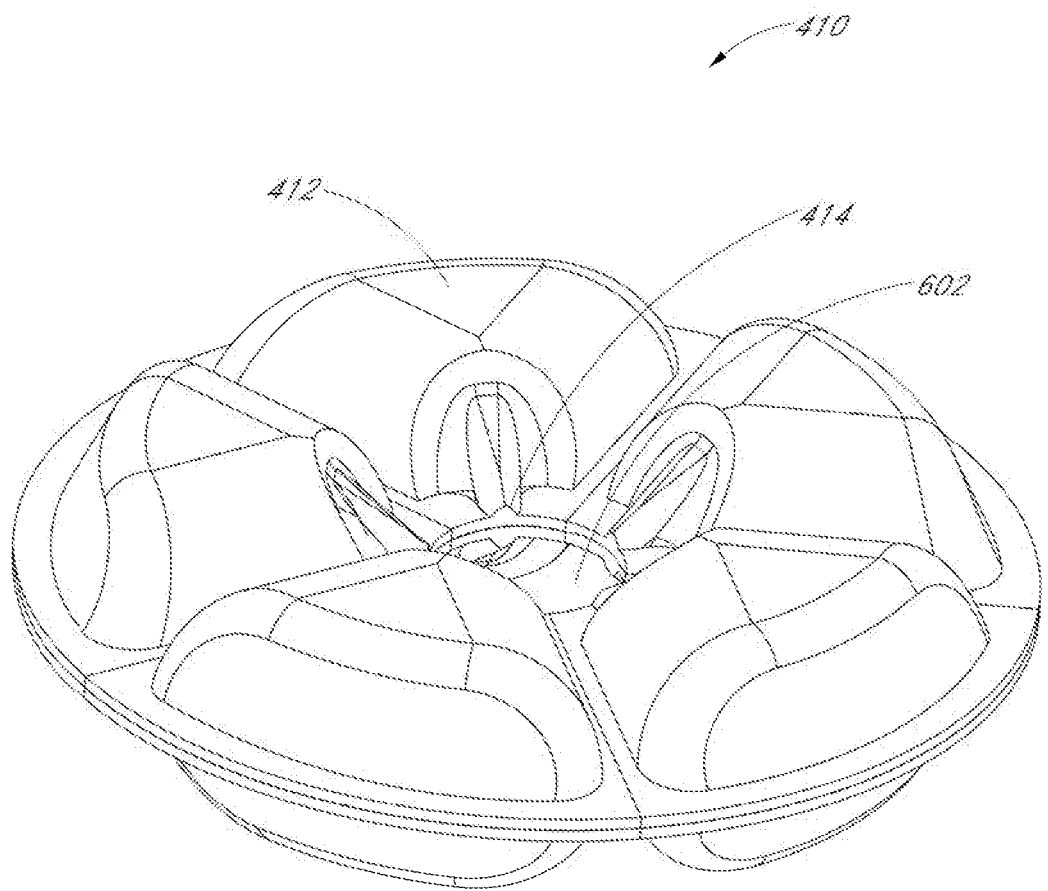
FIG. 6 is a perspective top view of a sealing washer.

FIG. 6 is a perspective top view of a sealing washer 410. The sealing washer 410 may comprise an annular body having a central opening 602 and defining one or more chambers 412 around the central opening 602. The one or more chambers 412 may contain a sealant (e.g., liquid silicone). Each of the one or more chambers 412 may include a dispensing portion 414 (also referred to herein as a sealant nozzle). The dispensing portion 414 may be weaker than the other portions of the inner side of the sealing washer such that under a compressive force above a threshold, the dispensing portion 414 will rupture before the other portions to direct sealant from the one or more chambers 412 toward the central opening.

Figure 7:
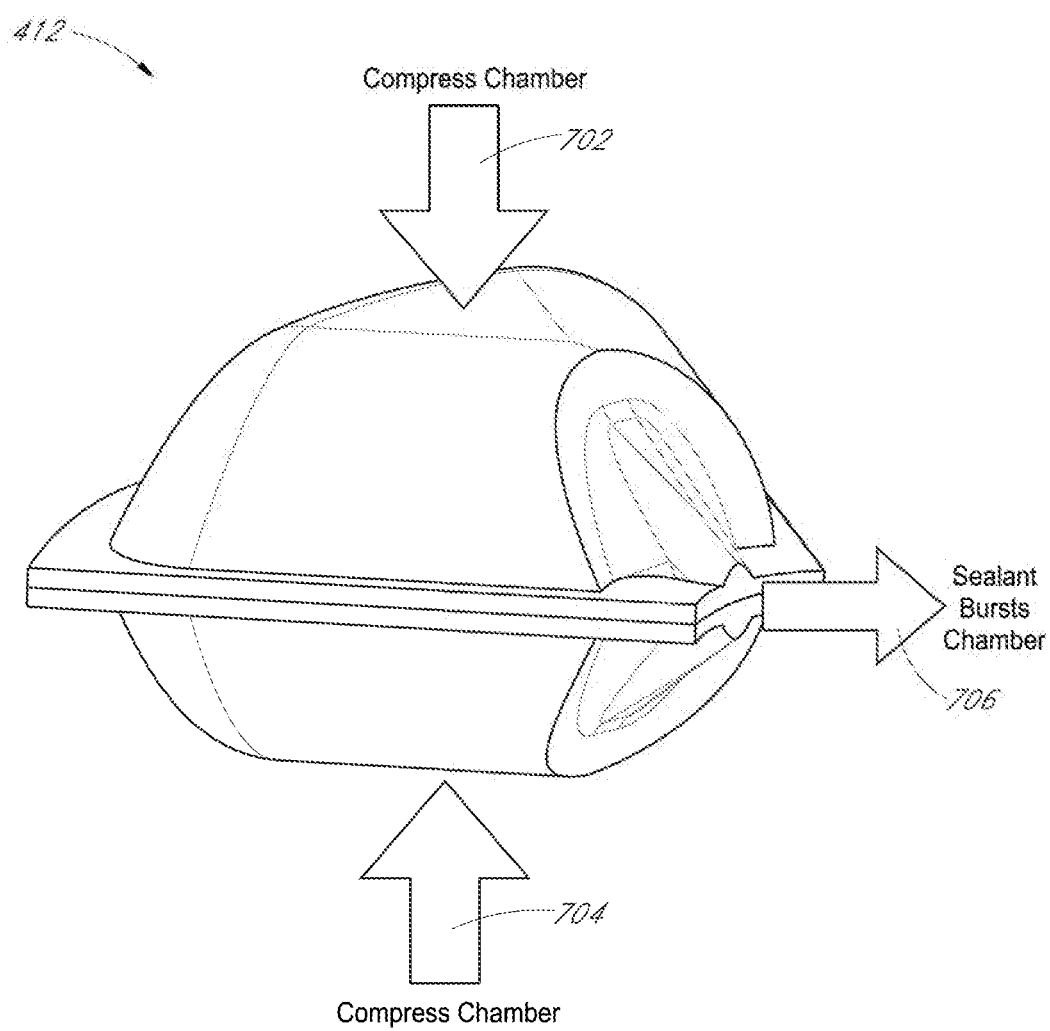
FIG. 7 is a cutaway side view of the sealing washer of FIG. 6.

FIG. 7 is a cutaway side view of a chamber 412 of a sealing washer 410 showing compressive forces along the Z axis acting on the sealing washer 410. When the first fastener 400 is driven into the mourning surface 102, the tension in the first fastener 400 results in a downward compressive force 702 applied by the head 402 of the first fastener 400 and an opposing upward compressive force 704 applied by the mounting surface 102. The opposing compressive forces 702 and 704 may cause the one or more chambers 412 of the sealing washer 410 to rupture and dispense the sealant inside the one or more chambers 412. The one or more chambers 412 may rupture at that one or more dispensing portions 414 directing sealant toward the central opening of 602 of the sealing washer 410 with the sealant flowing in the direction indicated by arrow 706. Thus, the compressive forces 702, 704 can be directed along an axial or longitudinal direction of the assembly 200A. When the compressive forces 702, 704 are sufficiently high (e.g., exceeding a threshold), the sealant can be pressed radially inwardly (e.g., generally transverse to the compressive forces) and can exit the chamber 412 by way of the ruptured dispensing portions 414.

It will be understood that when the mounting assembly 200A is installed on the mounting surface 102 as shown in FIG. 4A, the first fastener 400 may bear most if not all of the tension and resulting forces from securing the mounting assembly 200A relative to the mounting surface 102. The compressive forces 702 and 704 may have also ruptured the sealing washer 410 and dispensed sealant around the shaft 404, onto the flashing 206, and/or into the mounting aperture 208, waterproofing the securement of the first fastener 400 to the mounting surface 102. The second fastener 416 is inserted through the mounting bracket 422, driven into the connector portion 406 of the first fastener 400, and secures the mounting bracket 422 relative to the first fastener 400. It will, therefore, be understood that the second fastener 416 may bear most if not all of the tension and resulting forces from securing the mounting bracket 422 to the top of the mounting surface 102. Accordingly, the tension on the second fastener 416 may be isolated front the tension on the first fastener 400 and vice versa. In this way, the total tension and load on each of the first fastener 400 and the second fastener 416 may be reduced.

Figure 8:
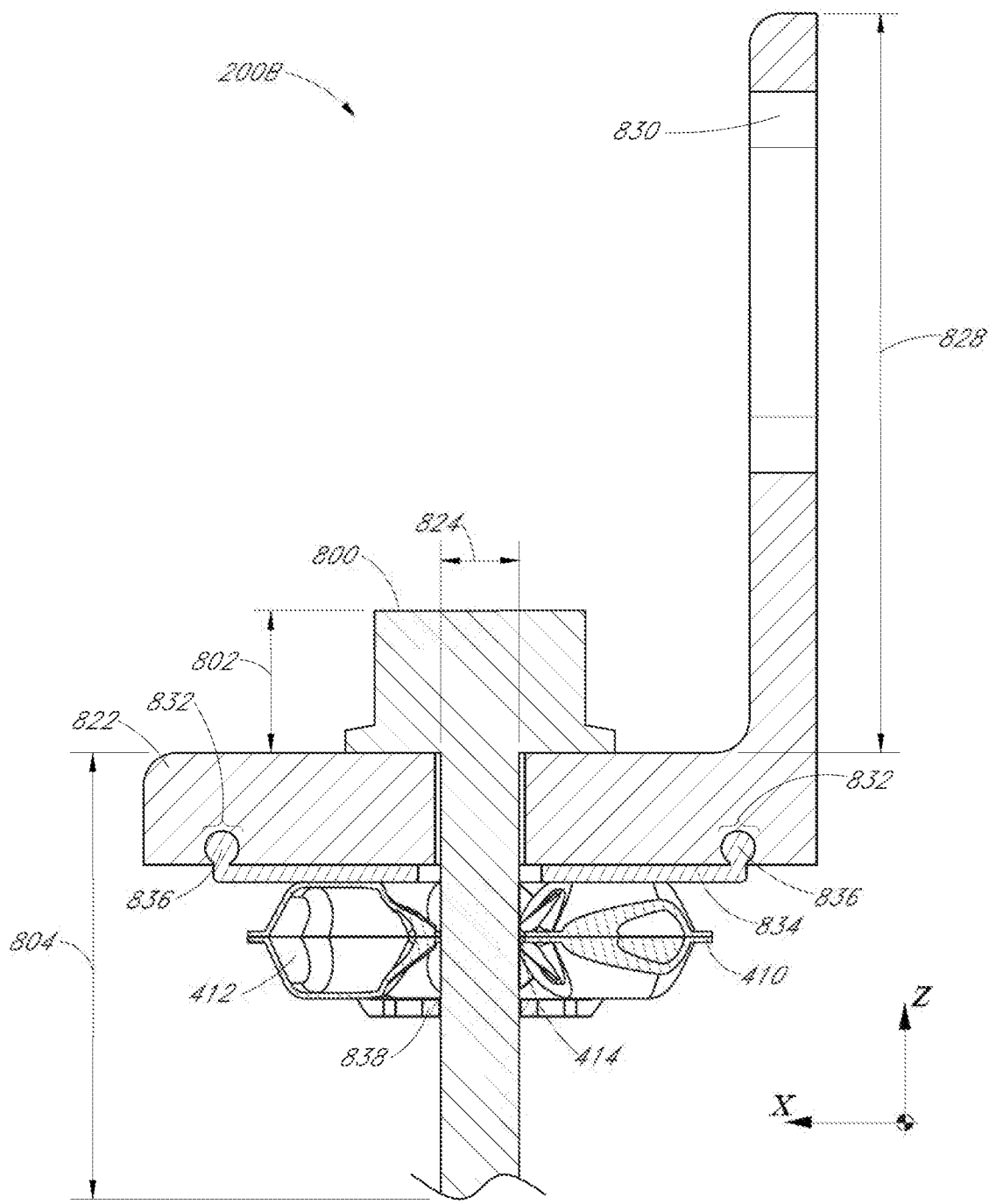
FIG. 8 is an assembled side view of an alternative mounting assembly according to various embodiments.
Figure 9:
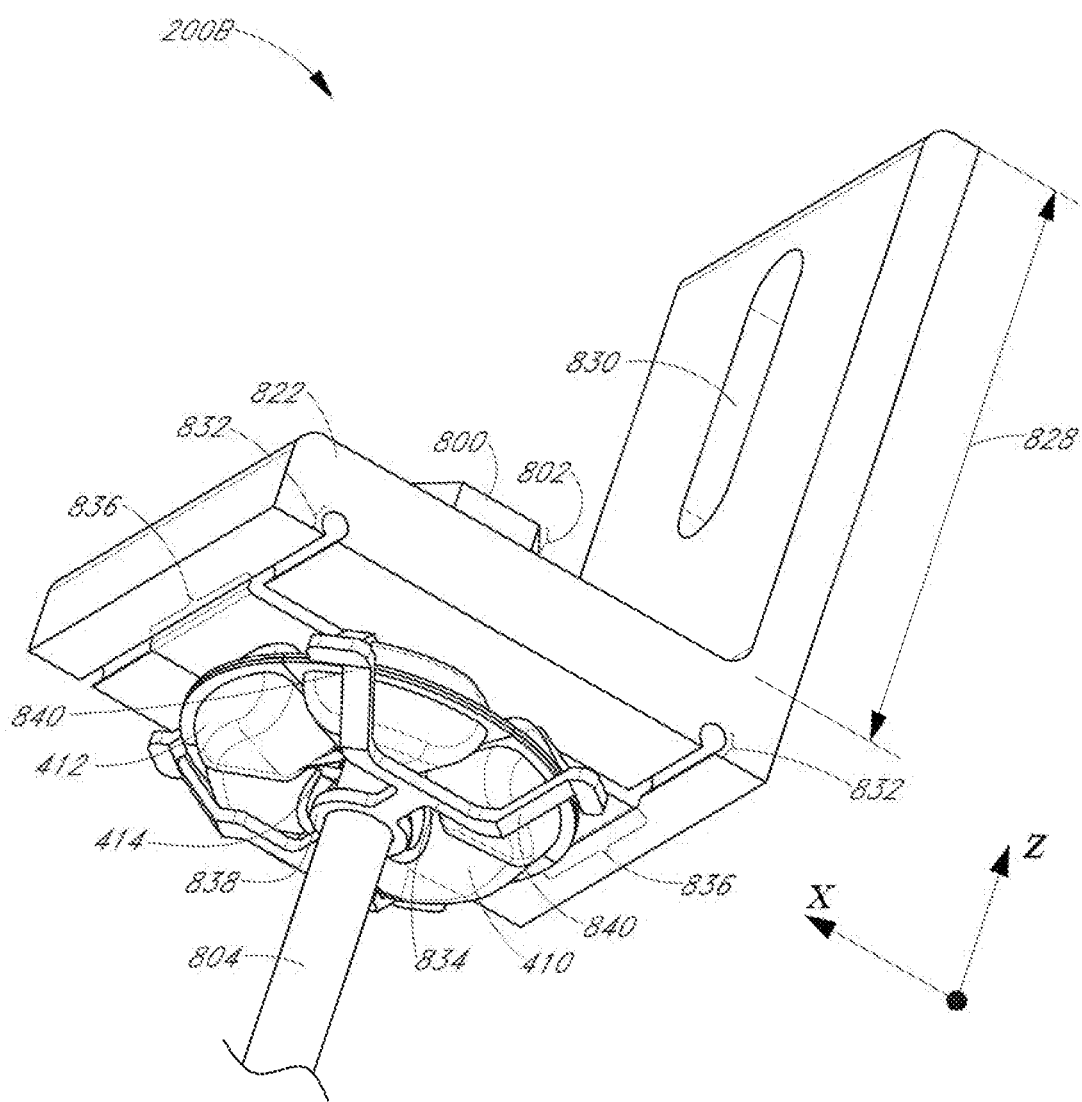
FIG. 9 is an assembled perspective view of the underside of the alternative mounting assembly of FIG. 8.

Mounting Assembly 200B and Sealing Washer 410—FIGS. 8-9

FIG. 8 shows an assembled side-view of a mounting assembly 200B. FIG. 9 shows an assembled perspective view of the underside of the mounting assembly 200B. The mounting assembly 200B may include a first fastener 800, a sealing washer 410, a mounting bracket 822, and a sealing washer retainer 834. The mounting assembly 200B may be partially disposed through a mounting aperture 208 and partially disposed on top of a flashing 206. A mounting assembly 200B and flashing 206 may be partially disposed on top of a mounting surface 102 as discussed herein. The first fastener 800 and mounting bracket 822 may comprise metal (e.g., steel), the sealing washer retainer 834 may comprise polymer, metal, or composite material, and the sealing washer 410 may comprise polymer.

The mounting bracket 822 may include an opening 824, vertical member 828, and one or more retainer receivers 832. The opening 824 may receive the first fastener 800. The vertical member 828 may include an aperture 830. The aperture 830 may accept a fastener (not shown) and be used to couple to a fixture (e.g., a rail 202). Each retainer receivers 832 may receive coupling members 836 of the sealing washer retainer 834.

The first fastener 800 may include a head 802 and a shaft 804. The shaft 804 may be disposed through opening 824 of mounting bracket 822, through the central opening 602 of the sealing washer 410, through the flashing 206, into the mounting aperture 208, and into the mounting surface 102. The shaft 804 way include one or more surfaces configured to engage with the mounting surface 102 (e.g., a screw). The head 802 may include an upper side and a lower side. The upper side of the head 802 may include one or more surfaces that define a noncircular profile configured to be engaged by a corresponding profile of a tool to drive the first fastener 800 into the mounting aperture 208 and secure the first fastener 800 relative to the mounting surface 102 (e.g., the head 804 may be a hex head that be engaged by a wrench). When the first fastener 400 is engaged with the mounting surface 102, the lower side of the head 402 may exert downward pressure on the mounting bracket 822 and the sealing washer 410 and compress the sealing washer 410 causing the dispensing portion 414 of the sealing washer 410 to rupture and dispense sealant around the shaft 404 as discussed herein. For example, the first fastener 800 may be a lag screw with a hex head.

The sealing washer 410 (discussed herein in connection to FIGS. 6 and 7), may be disposed around the shaft 804 of the first fastener 800. The sealing washer 410 may be held against the lower side of the mounting bracket 822 by the sealing washer retainer 834. As discussed herein, the sealing washer 410 may be ruptured as a result of the compressive forces 702 and 704 acting on the sealing washer 410 from the mounting bracket 822 above the sealing washer 410 and the mounting surface 102 below the sealing washer 410. The sealing washer retainer 834 may redirect one or more of the compressive forces 702 and 704 and apply pressure to the sealing washer 410 more evenly. Accordingly, the sealing washer retainer 834 may ensure a more controlled dispensing of the sealant. Referring again to FIGS. 4A, 4B, and 5, it will be understood that the mounting bracket 422 may include retainer receivers 832 and the mounting assembly 200A may further include a sealing was retainer 834.

Referring again to FIGS. 8 and 9, the sealing washer retainer 834 be coupled to the mounting bracket 822 via one or more retainer receivers 832 receiving one or more coupling members 836. The sealing washer retainer 834 may include a central opening 838 disposed around the shaft 804. Extending outwardly from the central opening 838, the sealing washer retainer 834 may include a one or more arms 840. A coupling member 836 may be disposed on the end of each arm 840 distal from the central opening 838.

It will be understood that when the mounting assembly 200B is installed on the mounting surface 102 as shown in FIG. 8, the first fastener 800 may bear most if not all of the tension and resulting forces from securing the mounting assembly 200B relative to the mounting surface 102, and most if not all of the tension and resulting forces from securing the mounting bracket 822 to the top of the mounting surface 10. The compressive forces 702 and 704 may have also ruptured the sealing washer 410 and dispensed sealant around the shaft 804, onto the flashing 206, and/or into the mounting aperture 208, waterproofing the securement of the first fastener 800 to the mounting surface 102.

Figure 10:
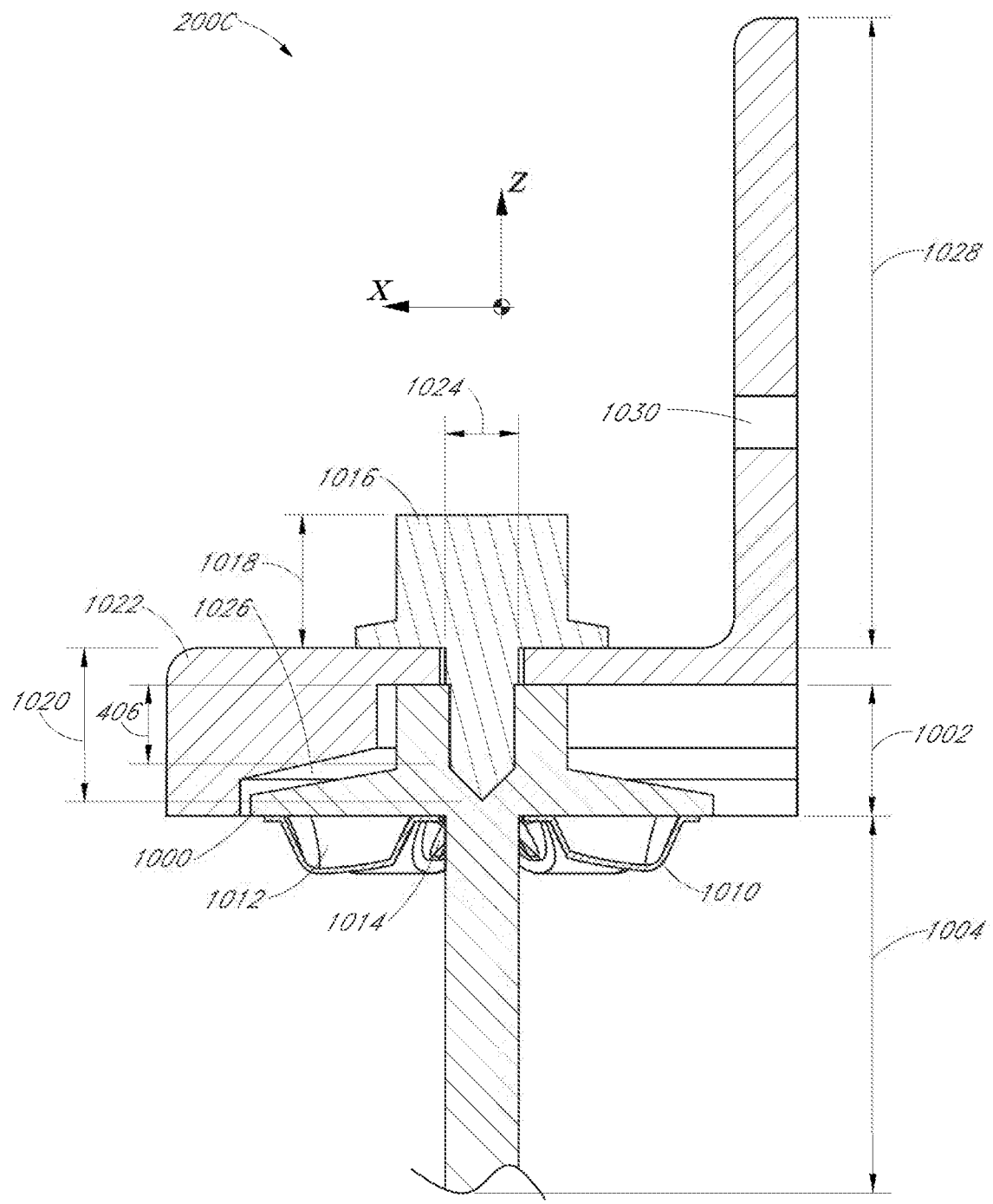
FIG. 10 is an assembled side view of an alternative mounting assembly according to various embodiments.

Mounting Assembly 200C and Sealing Washer—FIG. 10

FIG. 10 shows an assembled side-view of a mounting assembly 200C. The mounting assembly 200C includes a first fastener 1000, a sealing washer 1010, a second fastener 1016, and a mounting bracket 1022. The mounting assembly 200C may be partially disposed through a mounting aperture 208 and partially disposed on top of a flashing 206. A mounting assembly 200C and flashing 206 may be partially disposed on top of amounting surface 102 as discussed herein. The first fastener 1000, second fastener 1016, and mounting bracket 1022 may comprise metal (e.g., steel) and the seating washer 1010 may comprise polymer. The mounting assembly 200C may be substantially the same as or similar to the mounting assembly 200A with two substantial differences: (i) the head 402 of the first fastener 400 may include a cavity 408 whereas the head 1002 of the first fastener 1000 may not include such a cavity and (ii) unlike the sealing washer 410, the sealing washer 1010 may be flat on the top side proximal to the mounting bracket 1022. Additionally, the flat side of the sealing washer 1010 may be adhered to the lower side of the head 1004 of the first fastener 1000.

Similar to the mounting assembly 200A of FIGS. 4A, 4B, and 5, the first fastener 1000 may include a head 1002 and a shaft 1004. The head 1002 may include a connector portion 1006 and a cavity 1008. The shaft 1004 may be disposed through the flashing 206, into the mounting aperture 208, and into the mounting surface 102. The shall 1004 may include one or more surfaces configured to engage with the mounting surface 102 (e.g., a screw). The head 1002 may include an upper side and a lower side. The upper side of the head 1002 may include one or more surfaces that define a non-circular profile configured to be engaged by a corresponding profile of a tool to drive the first fastener 1000 into the mounting aperture 208 and secure the first fastener 1000 relative to the mounting surface 102 (e.g., the head 1004 may be a hex head adapted to be engaged by a wrench). The connector portion 1006 of the head 1002 may be disposed on the upper side of the head 1002 and into the top of the head 1002. The connector portion 1006 may include one or more surfaces configured to engage with a second fastener 1016 (e.g., the connector portion 1006 maybe an internally threaded surface configured to engage a screw). When the first fastener 1000 is engaged with the mounting surface 102, the head 1002 may exert downward pressure on the sealing washer 1010 and compress it causing the dispensing portion 1014 of the sealing washer 1010 to rupture and dispense sealant around the shaft 1014 as discussed herein. For example, the first fastener 1008 may be a lag screw with an internally threaded hexagonal head coupled to a sealing washer 1010.

The mounting bracket 1022 may include an opening 1024, cavity 1026, and vertical member 1028. Mounting bracket 1022 may be disposed on top of the first fastener 1000 and accept the head 1002 the first fastener 1000 into the cavity 1026. The opening 1024 may expose the connector portion 1006 of the head 1002 of the first fastener 1000. Vertical member 1028 may include an aperture 1030. The aperture 1030 may accept a fastener (not shown) and be used to couple to a fixture (e.g., a rail 202).

The second fastener 1016 may include a head 1018 and a shaft 1020. The shaft 1020 may be disposed through the opening 1024 of the mounting bracket 1022. The head 1018 may be disposed on top of the mounting bracket 1022. The shaft 1020 may include one or more surfaces configured to engage with the connector portion 1006 of the first fastener 1000. The head 1018 may include an upper side and a lower side with the shaft 1020 extending from the lower side of the head 1018. The upper side of the head 1018 of the second fastener 1016 may include one or more surfaces that define a non-circular profile configured to be engaged by a corresponding profile of a tool to drive the second fastener 1016. For example, the second fastener may be a machine screw with a hex head.

The sealing washer 1010 may be similar to the sealing washer 410 shown in FIGS. 6 and 7. However, instead of having a curved surface on the top and the bottom like the sealing washer 410, the sealing washer 1010 may be flat on one side. The sealing washer 1010 may comprise an annular body having a central opening and defining one or more chambers 1012 around the central opening. The one or more chambers 1012 may contain a sealant (e.g., liquid silicone). Each of the one or more chambers 1012 may include a dispensing portion 1014 (also referred to herein as a sealant nozzle). The dispensing portion 1014 may be weaker than the other portions of the inner side of the sealing washer such that under a compressive force above a threshold, the dispensing portion 1014 will rupture before the other portions to direct sealant from the one or more chambers 1012 toward the central opening.

It will be understood that when the mounting assembly 200C is installed on the mounting surface 102 as shown in FIG. 10, the first fastener 1000 may bear most if not all of the tension and resulting forces from securing the mounting assembly 200C relative to the mounting surface 102. The compressive forces may have also ruptured the sealing, washer 1010 and dispensed sealant around the shaft 1004, onto the flashing 206, and/or into the mounting aperture 208, waterproofing the securement of the first fastener 1000 to the mounting surface 102. The second fastener 1016 may be inserted through the mounting bracket 1022, driven into the connector portion 1006 of the first fastener 1000, and securing the mounting bracket 1022 relative to the first fastener 1000. It will, therefore, be understood that the second fastener 1016 may bear most if not all of the tension and resulting forces from securing the mounting bracket 1022 to the top of the mounting surface 102. Accordingly, the tension on the second fastener 1016 may be isolated from the tension on the first fastener 1000 and vice versa, in this way, the total tension and load on each of the first fastener 1000 and the second fastener 1016 may be reduced.

Figure 11:
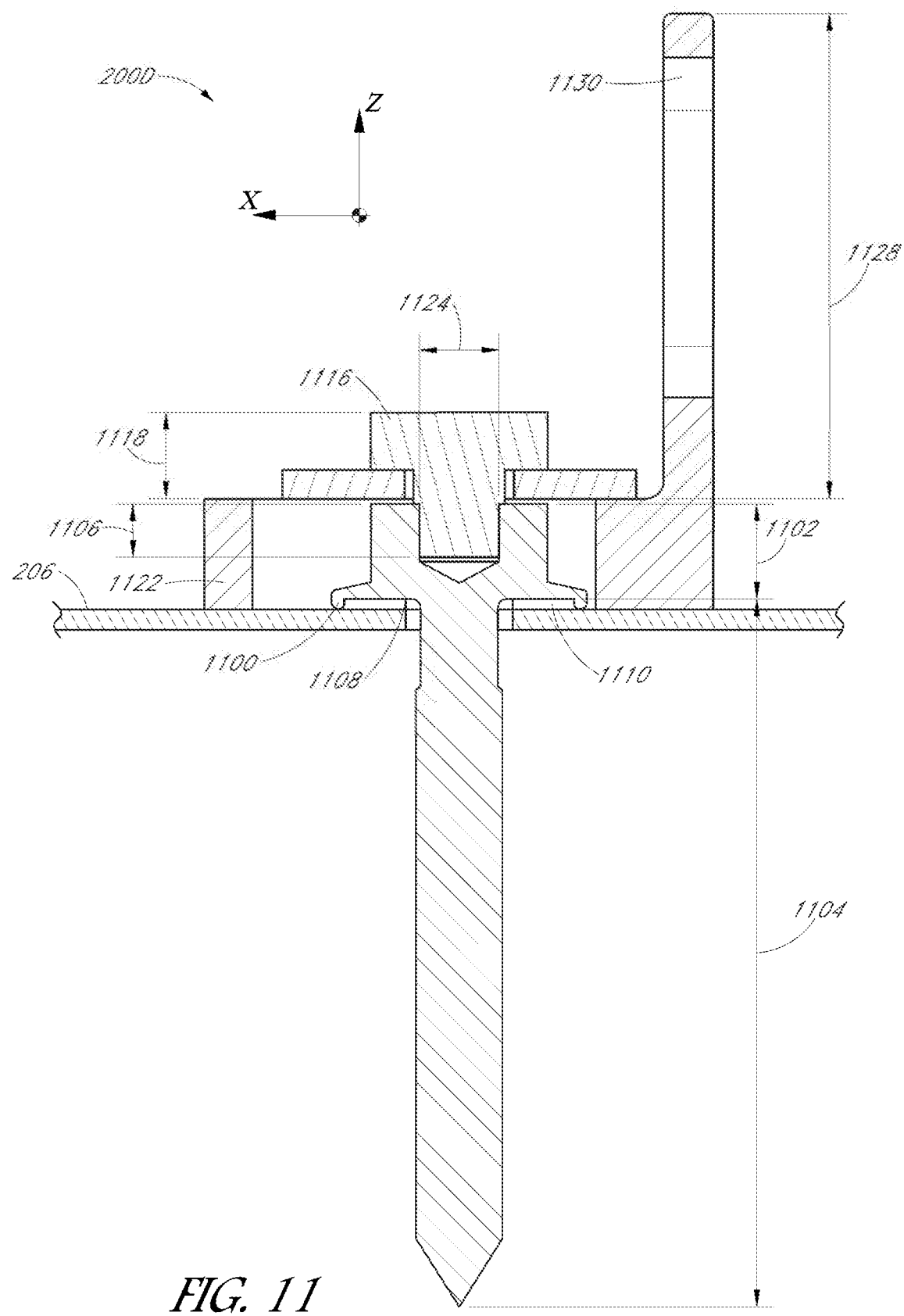
FIG. 11 is an assembled side view of an alternative mounting assembly according to various embodiments.

Mounting Assembly 200D and Washer 1110—FIG. 11

FIG. 11 shows an assembled side-view of a mounting assembly 200D coupled to a flashing 206. The mounting assembly 200D includes a first fastener 1100, a solid polymer washer 1110, a second fastener 1116, and a mounting bracket 1122. The mounting assembly 200D may be partially disposed through a mounting aperture 208 and partially disposed on top of a flashing 206. A mounting assembly 200A and flashing 206 may be disposed on top of a mounting surface 102 as discussed herein. The first fastener 1100, second fastener 1116, and mounting bracket 1122 may comprise metal (e.g., steel) and the solid polymer washer 1110 may comprise polymer (e.g., plastic, rubber). The mounting assembly 200D may be substantially the same as or similar to the mounting assembly 200A except that a solid polymer washer 1110 may be used instead of a sealing washer 410. Unlike the sealing washer 410, the solid polymer washer 1110 may deform under compressive force, but the solid polymer washer 1110 may not contain or dispense any sealant.

The first fastener 1100 may include a head 1102 and a shaft 1104. The head 1102 may include a connector portion 1106 and a cavity 1108. The shaft 1104 may be disposed through the flashing 206 into the mounting aperture 208 into the mounting surface 112. The shaft 1104 they include one or more surfaces configured to engage with the mounting surface 112 (e.g., a screw). The head 1102 may include an upper side and a lower side. The upper side of the head 1102 may include one or more surfaces that define a non-circular profile configured to be engaged by a corresponding profile of a tool to drive the first fastener 1100 into the mounting aperture 208 and secure the first fastener 1100 relative to the mounting surface 112 (e.g., the head 1104 may be a hex head that be engaged by a wrench). The connector portion 1106 of the head 1102 may be disposed on the upper side of the head 1102 and into the top of the head 1102. The connector portion 1106 may include one or more surfaces configured to engage with a second fastener 1116 (e.g., the connector portion 1106 maybe an internally threaded surface configured to engage a screw). The lower side of the head 1102 may include a cavity 1108 configured to accept an annular washer (e.g., a solid polymer washer 1110). When the first fastener 1100 is engaged with the mounting surface 112, the head 1102 may exert downward pressure on the solid polymer washer 1110 and compress it. For example, the first fastener 1108 may be a lag screw with an internally threaded hexagonal head including a cavity configured to accept a solid polymer washer 1110 and compress it against the flashing 206 as discussed herein.

The mounting bracket 1122 may include an opening 1124, cavity 1126, and vertical member 1128. Mounting bracket 1122 may be disposed on top of the first fastener 1100 and accept the head 1102 the first fastener 1100 into the cavity 1126. The opening 1124 may expose the connector portion 1106 of the head 1102 of the first fastener 1100. Vertical member 1128 may include an aperture 1130. The aperture 1130 may accept a fastener (not shown) and be used to couple to a fixture (e.g., a rail 202).

The second fastener 1116 may include a head 1118 and a shaft 1120. The shaft 1120 may be disposed through the opening 1124 of the mounting bracket 1122. The head 1118 may be disposed on top of the mounting brackets 1122. The shaft 1120 may include one or more surfaces configured to engage with the connector portion 1106 of the first fastener 1100. The head 1118 may include an upper side and a lower side with the shaft 1120 extending from the lower side of the head 1118. The upper side of the head 1118 of the second fastener 1116 may include one or more surfaces that define a non-circular profile configured to be engaged by a corresponding profile of a tool to drive the second fastener 1116. For example, the second fastener may be a machine screw with a hex head.

The solid polymer washer 1110 may be an annular body having a central opening. The solid polymer washer 1110 may be disc-shaped and substantially flat on the top and bottom side with the central opening in the middle. Alternatively, the solid polymer washer 1110 may be toroidal with curved surfaces on the top and bottom. Alternatively, the solid polymer washer 1110 may be flat on the top side and curved on the bottom side or vice versa. The solid polymer washer 1110 may be flexible and elastically deform under compressive force and aid in sealing the mounting aperture 208 to prevent moisture from penetrating the mounting surface 102. The solid polymer washer 1110 may be, for example, a plastic or rubber washer.

It will be understood that when the mounting assembly 200D is installed on the mounting surface 102 as shown in FIG. 11, the first fastener 1100 may bear most if not all of the tension and resulting forces from securing the mounting assembly 200D relative to the mounting surface 102. The compressive forces may have deformed the solid polymer washer 1110 to plug voids between the shaft 1104 and the edge of the mounting aperture 208 and thereby inhibit or prevent moisture from entering the mounting aperture 208. The second fastener 1116 is inserted through the mounting bracket 1122, driven into the connector portion 1106 of the first fastener 1100, and securing the mounting bracket 1122 relative to the first fastener 1100. It will, therefore, be understood that the second fastener 1116 may bear most if not all of the tension and resulting forces from securing the mounting bracket 1122 to the top of the mounting surface 102. Accordingly, the tension on the second fastener 1116 may be isolated from the tension on the first fastener 1100 and vice versa. In this way, the total tension and load on each of the first fastener 1000 and the second fastener 1116 may be reduced.

Figure 12:
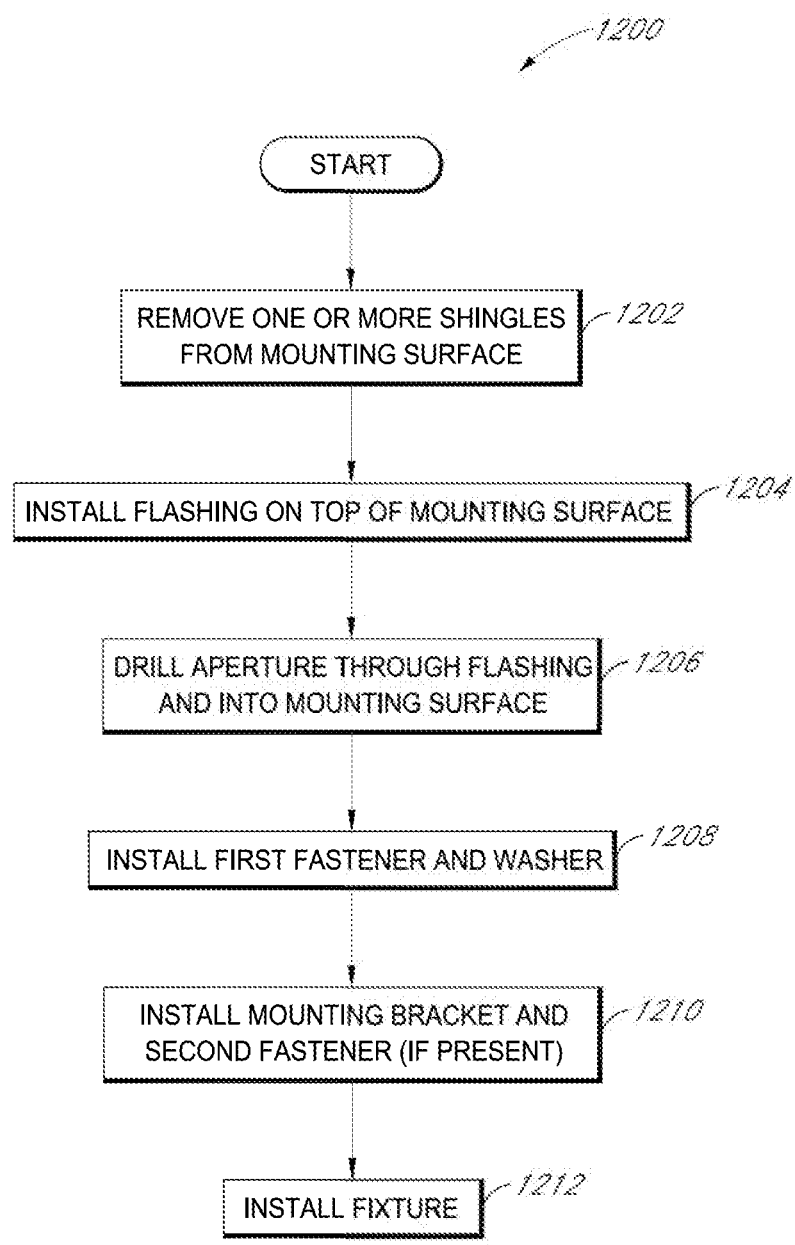
FIG. 12 is a flowchart illustrating an example installation method for a mounting assembly in accordance with various described embodiments.

Installing the Mounting Assembly—FIG. 12

Referring now to FIG. 12, a block diagram illustrates a mounting assembly installation method 1200. The method 1200 may be performed by a user (e.g., a technician, construction worker, homeowner, etc.) using the mounting assembly 200 to attach a fixture (e.g., a rail 202, etc.) to a mounting surface 102 (e.g., a roof, carport, etc.). Depending on the configuration of the mounting surface 102, whether there are shingles on the mounting surface 102, whether a moisture barrier installation is needed, whether a flashing 206 has already been installed, etc., some of the steps of method 1200 may be omitted by the user.

Assuming the user is starting with a mounting surface with shingles, the user may remove one or more shingles to expose the mounting surface 102 at method step 1202. At step 1204, the user may install a flashing 206 and replace shingles to ensure a moisture barrier according to known techniques. At step 1206, the user may form a mounting aperture 208 through the flashing 206 and into the mounting surface 102 (e.g., by drilling hole through both). Alternatively, the flashing 206 may have a hole in it already, in which case the user may form a mounting aperture 208 into the mounting surface 102 through the existing hole. In some embodiments, the mounting surface 102 may be a corrugated metal roof and in such cases the user may simply form a mounting aperture 208 by drilling a hole with or without a flashing 206.

At step 1208, the user may install the shaft 404, 804, 1004, 1104 of the first fastener 400, 800, 1000, 1100 into the mounting aperture 208 with the washer 410, 1010, or 1110 disposed around the shaft 404, 804, 1004, 1104, and tighten then fastener 400, 800, 1000, 1100 to secure it relative to the mounting surface 102. For mounting assemblies 200A, 200B, and 200C the sealing washer 410, 810, 1010 can be configured to rupture and dispense sealant during step 1208. In the case of fastener 200C, the user may place the mounting bracket 822 on top of the mounting aperture 102 before installing the first fastener 800. At step 1210, the user may place the mounting bracket 422, 1022, 1122 on top of the first fastener 400, 1000, 1100. At step 1212, the user may install second fastener 416, 1016, 1116 through the opening 424, 1024, 1124 and drive the second fastener into the connector portion 406, 1006, 1106 to secure the mounting bracket 422, 1022, 1122 relative to the first fastener 400, 1000, 1100. At step 1214, the user may couple the fixture to the mounting assembly 200 by inserting, a fastener through the aperture 430, 830, 1030, 1130 and securing the fixture relative to the mounting assembly 200.

In an embodiment, a mechanical anchor point sealing device can be used for mechanical anchor point sealing on a composition tile roof, for example. The mechanical anchor point sealing device can allow for rapid installation, as well as providing multiple layers of waterproof protection. The roof of a house is a protective barrier against the environment, particularly water and moisture. For solar installations and other roof-mounted structures, holes are typically drilled through this protective barrier to place mechanical anchor points. Additionally, flat corrosion resistant flashing is typically required for penetration of the protective barrier. However, the anchor point sealing device described herein can improve installation and provide multiple layers of waterproof protection.

Figure 13:
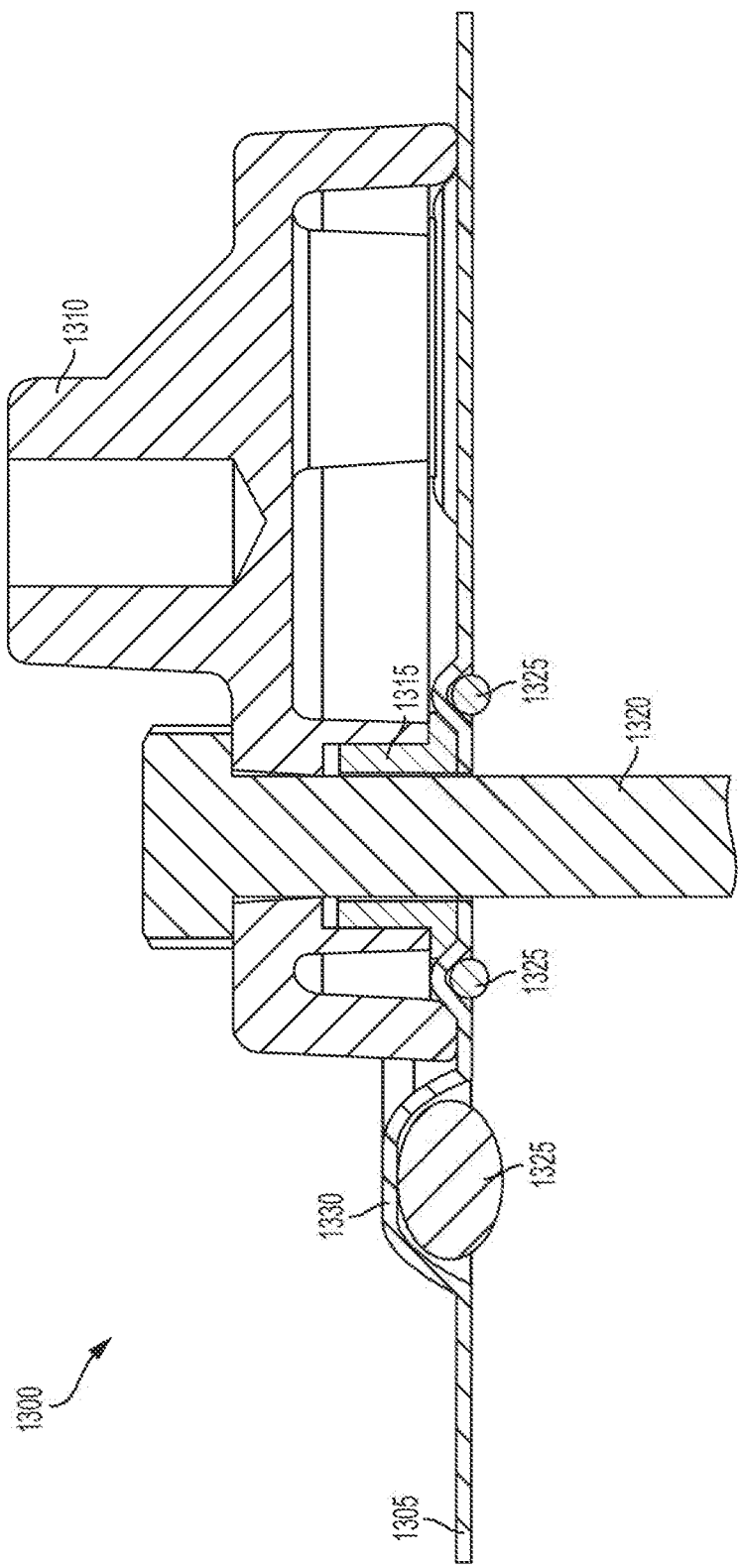
FIG. 13 depicts a cross section of an anchor point sealing device according one or more aspects of the disclosed subject matter.

FIG. 13 depicts a cross section of an anchor point sealing device 1300 (herein device 1300) according to one or more aspects of the disclosed subject matter. The device 1300 can include flashing 1305, a structural block 1310, a sealing gasket 1315, a threaded anchor 1320, and a liquid adhesive sealant 1325. The flashing 1305 can be a flat corrosion resistant flashing. The flashing 1305 can be a first layer of water protection by shingling or layering the flashing 1305 within the layers of the roofing material (e.g., shingles). This layer utilizes gravity to take advantage of downhill water flow to provide significant protection against water.

A second level of water protection can be provided by the liquid adhesive sealant 1325. The liquid adhesive sealant 1325 can be utilized under the flashing 1305 to bond the flashing to the roof material and provide a level of vapor protection. Additionally, the liquid adhesive sealant 1325 can protect against upward intrusion of water from wind-blown rain and wicking action, for example. Additionally, the design of the device 1300 improves implementing the liquid adhesive sealant 1325 because a run-off guard, as further described herein, can serve as a guide for appropriate placement of the liquid adhesive sealant 1325. In an embodiment, the locations corresponding to the liquid adhesive sealant as depicted in FIG. 13 can be gaskets.

The structural block 1310 can be a structural mounting bracket. The structural mounting bracket can utilize a raised ridge as a run-off guard 1330 integrally formed into the flashing 1305 as a levee against the flow of water down the roof slope. The run-off guard 1330 can be placed against the structural block 1310 (i.e., the structural mourning bracket) and serve as a guide for proper orientation of the structural block 1310. By placing the run-off guard in front of the mounting structure, an effective radius of the ridge increases the contact area of the structure against the flashing.

Directly mounting the structural block 1310 on the flashing 1305 in conjunction with a pre-load applied by the threaded anchor 1320 can create an additional layer of water protection. The threaded anchor 1320 can be a threaded anchor screw. The flat surfaces form to each other only allowing water intrusion at a relatively high pressure differential. The pressure differential may correspond to a standard that defines pressure differential for flashings as would be known by one of ordinary skill in the art. Water that does make it past this additional level of sealing can run downhill due to gravity and be directed to escape through an integrated drainage port (e.g., integrated drainage port 1505 in FIG. 15). This layer of water protection protects the sealing gasket 1315.

The sealing gasket 1315 is an internal sealing gasket that fully encompasses the threaded anchor 1320. The sealing aasket 1315 interfaces with a raised disk in the flat flashing 1305. The flat disk can provide uniform compression of the gasket seal, and can prevent gasket extrusion which can lead to gasket cracking and failure. Additionally, the sealing gasket 1315 provides a tactile location for the mounting structure on the flashing 1305.

Figure 14:
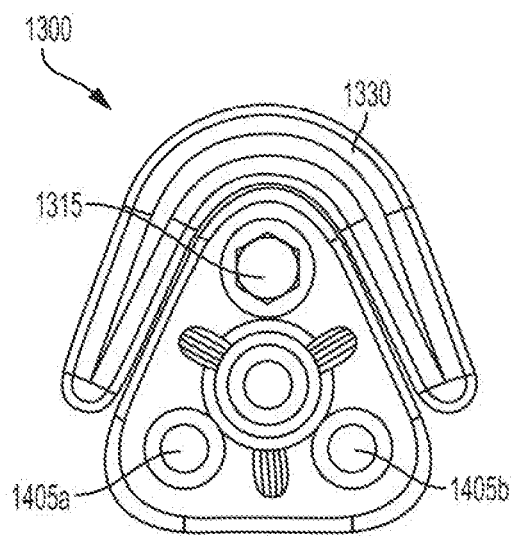
FIG. 14 depicts a top view of an anchor point sealing device according to one or more aspects of the disclosed subject matter.

FIG. 14 depicts a top view of the anchor point sealing device 1300 according to one or more aspects of the disclosed subject matter. The top view of the device 1300 includes the run-off guard 1330 and the threaded anchor 1315. The anchor point sealing device 1300 can include holes 1405a, 1405b. The holes 1405a, 1405b can be an area of the device 1300 through which deck screws can be inserted to secure the device 1300 to the surface on which it is being installed. The holes 1405a, 1405b can correspond to the location of a rubber insert for each hole 1405a, 1405b that can seal each location, respectively, until the hole needs to be used. For example, the sealing bumps in the flashing 1305 are pre-drilled in one position. That way, if a deck attachment is not used, the flashing 1305 provides a continuous barrier. However, when installing a deck attachment, the flashing would be penetrated using a self-drilled through with one or more deck screws (e.g., threaded anchor 1315) for the deck attachment. As a result, the rubber insert can be drilled through in the process of installing the deck attachment using a deck screw, for example. When installing a deck attachment, three fasteners are used including deck screws (e.g., threaded anchor 1315) in holes 1405a, 1405b. When a deck attachment is not used, a rubber insert can act as a sealing component for the anchor point sealing device 1300. In an embodiment, a sealing gasket (e.g., sealing gasket 1315) can be designed to seal the hole (e.g., holes 1405a, 1405b) until the hole is used for a deck attachment.

In an embodiment, the anchor point sealing device 1300 can utilize post machined extrusions rather than cast parts. For example, the sealing gasket 1315 can be held in a counter-bored hole. Additionally, an inward sloping bevel seals against the inside of the raised formed ring. Further, an outward sloping bevel can be machined into the base piece and can locate the seal properly over the hole.

Figure 15:
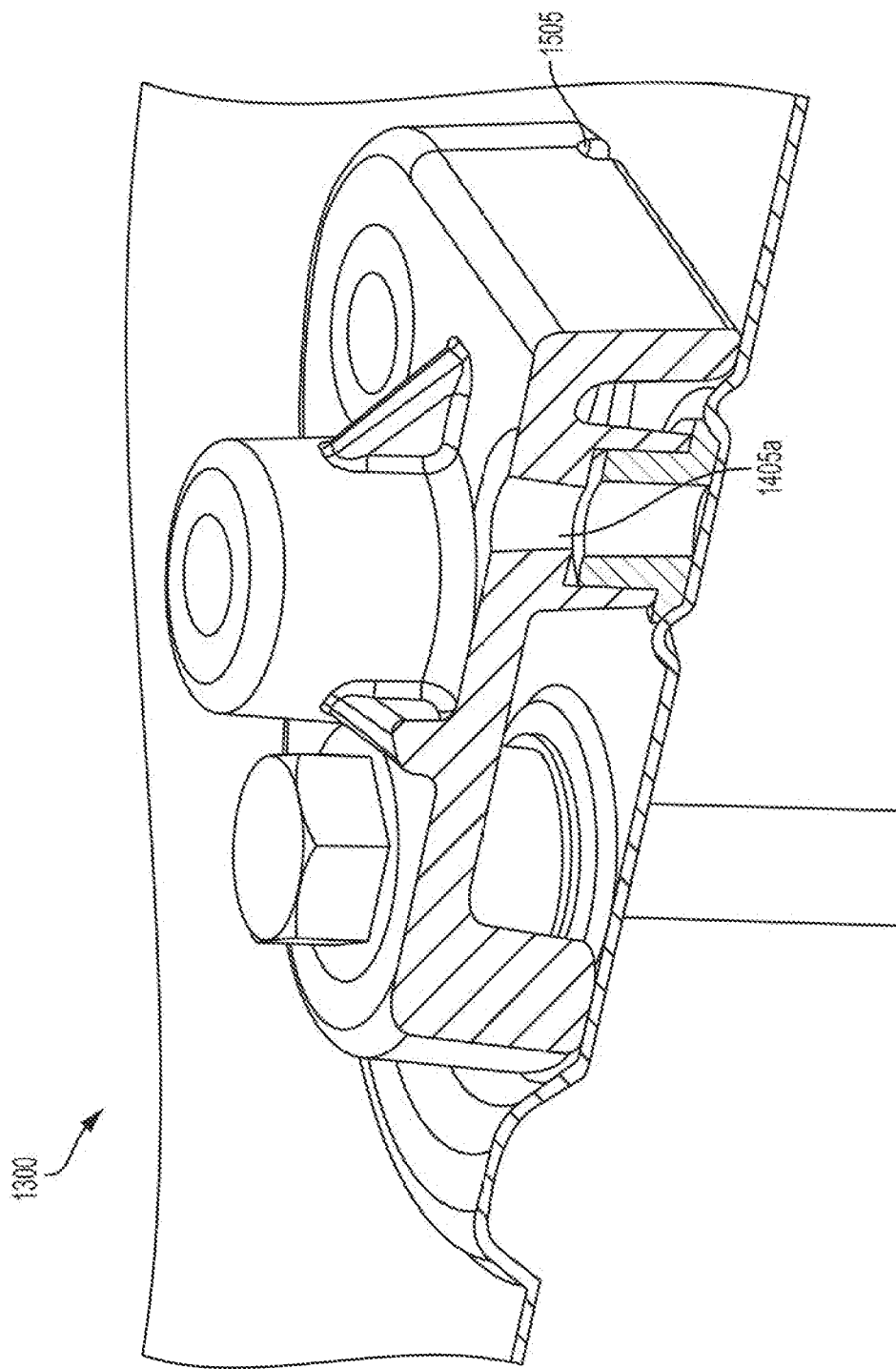
FIG. 15 depicts a perspective view of an anchor point sealing device according to one or more aspects of the disclosed subject matter.

FIG. 15 depicts a perspective view of the anchor point sealing device 1300 according to one or more aspects of the disclosed subject matter. The anchor point sealing device 1300 can include one or more integrated drainage port 1505. Integrated drainage port 1505 can direct excess water to escape from the anchor point sealing device 1300.

Figure 16:
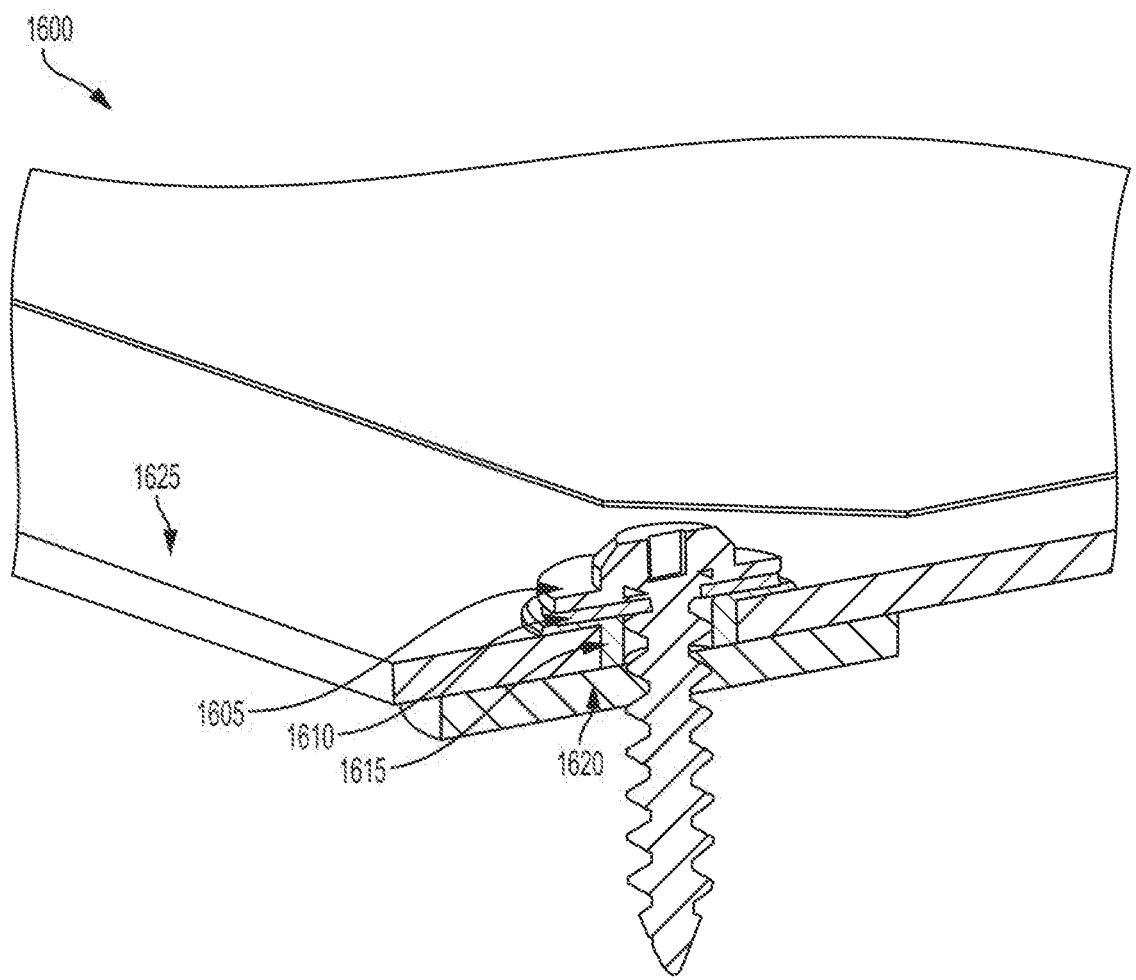
FIG. 16 depicts a cross section of a waterproof mechanical attachment system according to one or more aspects of the disclosed subject matter.

FIG. 16 depicts a cross section of a waterproof mechanical attachment system 1600 according to one or more aspects of the disclosed subject matter. The waterproof mechanical attachment system 1600 can be used to attach a solar laminate 1625 directly to an existing roof, for example, while ensuring a waterproof attachment. In an embodiment, a plurality of the waterproof mechanical attachment systems 1600 can be used to attach one or more solar laminate sections directly to a rooftop, for example. The waterproof mechanical attachment system 1600 can include an attachment device 1605 (e.g., a screw), a seal 1610, a grommet 1615, and a butyl adhesive gasket 1620. The seal 1610 can be positioned between the grommet 1615 and the attachment device 1605. The seal 1610 can provide a seal between the attachment device 1605 and the solar laminate 1025 to prevent ingress of water from a topside of the solar laminate 1625, for example. The grommet 1615 can be positioned between the seal 1610 and the solar laminate 1625 and can prevent over-tightening of the attachment device 1605 (e.g., screw) while additionally providing sealing surfaces. The butyl adhesive gasket 1620 can seal between the solar laminate 1625 and the rooftop. Additionally, the butyl adhesive gasket 1020 can seal around the attachment device 1605 (e.g., around the screw threads). In an embodiment, the waterproof mechanical attachment system 1600 can be used in place of or in combination with an adhesive (e.g., construction adhesives used to attach a solar laminate directly to a rooftop). Additionally, the waterproof mechanical attachment system 1600 can provide improved load resisting capability and installation robustness (e.g., when compared to using only adhesives).

It should be appreciated that one or more of the components depicted and/or described in FIG. 1-FIG. 16 can be combined in an embodiment. For example, the roof attachment and sealing features from one or more embodiments can be combined to provide a unique water sealing surface attachment, wherein different combinations of features may provide solutions to different types of installation and/or sealing problems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

(1) A mounting assembly coupled to a mounting surface having a mounting aperture, the mounting assembly comprising a first fastener comprising a first head comprising an upper side and a lower side, the upper side of the head having one or more surfaces that define a connector portion; and a first shaft extending from the lower side of the first head into the mounting aperture of the mounting surface; a sealing washer disposed around the first shaft of the first fastener between the mounting surface and the lower side of the first head of the first fastener, the sealing washer defining one or more chambers adapted to contain a sealant, the one or more chambers comprising a frangible dispensing portion configured to rupture when a pressure of the sealant in the chamber exceeds a threshold, the frangible dispensing portion configured to direct the sealant toward the first shaft of the first fastener upon rupture; a second fastener engaging the connector portion of the first fastener, the second fastener comprising a second head comprising an upper side and a lower side; and a second shaft extending from the lower side of the second head into the connector portion of the first head of the first fastener to secure the second fastener relative to the first fastener; and a mounting bracket disposed between the first head of the first fastener and the second head of the second fastener such that the second shaft of the second fastener extends through an opening in the mounting bracket.

(2) The mounting assembly of (1), further comprising a flashing disposed between the sealing washer and the mounting surface, wherein the first shaft of the first fastener extends through flashing.

(3) The mounting assembly of (1)-(2), the sealant has been directed onto the first shaft of the first fastener and the flashing.

(4) The mounting assembly of (1)-(3), further comprising a fixture disposed atop the mounting surface, wherein the mounting bracket is coupled to the fixture.

(5) The mounting assembly of (1)-(4), wherein the fixture comprises a rail.

(6) The mounting assembly of (1)-(5), wherein a solar module is coupled to the rail.

(7) The mounting assembly of (1)-(6), wherein the mounting bracket defines a first cavity receiving a portion of the first head of the first fastener and wherein the lower side of the first fastener defines a second cavity receiving a portion of the sealing washer.

(8) The mounting assembly of (1)-(7), wherein the upper side of the second head of the second fastener comprises one or more surfaces that define a non-circular profile configured to be engaged by a corresponding profile of a tool to drive the second fastener.

(9) The mounting assembly of (1)-(8), wherein each of the one or more chambers of the sealing washer includes a corresponding dispensing portion disposed on an interior circumference of the sealing washer.

(10) The mounting assembly of (1)-(9), wherein the sealant comprises silicone.

(11) A method for installing a mounting assembly on a mounting surface, the method comprising forming a mounting aperture into the mounting surface; providing a first fastener having a first head and a first shaft; providing a sealing washer having a central opening and defining one or more chambers containing sealant, the one or more chambers comprising a frangible dispensing portion configured to rupture when a pressure of the sealant in the chamber exceeds a threshold, the frangible dispensing portion configured to direct the sealant toward the central opening upon rupture; installing the first shaft of the first fastener through the central opening of sealing washer and into the mounting aperture; rupturing one or more of the one or more chambers and dispensing sealant towards the first shaft of the first fastener; placing a mounting bracket having an opening on top of the first head of the first fastener; providing a second fastener having a second head and a second shaft; installing the second shaft of the second fastener through the opening; and securing the second shaft of the second fastener relative to the first fastener.

(12) The method of (11), further comprising installing a flashing on top of the mounting surface; and forming a hole through the flashing, wherein installing the first shaft of the first fastener through the sealing washer and into the mounting aperture includes installing the first shaft of the first fastener through the hole through the flashing.

(13) The method of claim (11)-(12), wherein the one or more chambers of the sealing washer each include a dispensing portion adapted to dispense sealant towards the first shaft of the first fastener; and wherein rupturing one or more of the one or more chambers and dispensing sealant towards the shaft of the first fastener includes dispensing sealant through the dispensing portions of the one or more chambers of the sealing washer.

(14) The method of claim (11)-(13) further comprising installing a fixture can top of the mounting surface; and coupling the fixture to the mounting bracket.

(15) The method of (11)-(14) wherein the fixture comprises a rail.

(16) The method of (11)-(15) further comprising securing a solar module to the rail.

(17) The method of (11)-(16) wherein placing a mounting bracket having an opening on top of the first head of the first fastener includes receiving a portion of the first head of the first fastener into a cavity of the mounting bracket.

(18) The method of (11)-(17), wherein the first head of the first fastener defines an internally threaded cavity, wherein the second shaft of the second fastener is threaded, and wherein securing the second shaft of the second fastener to the first head of the first fastener includes rotating the second fastener to engage the threaded shaft of the second fastener with the internally threaded cavity of the first head of the first fastener.

(19) An apparatus comprising a washer comprising an annular body having a central opening and defining one or more chambers around the central opening, the one or more chambers containing a sealant, and the annular body having one or more dispensing portions that are weaker than other portions of the annular body, the one or more dispensing portions disposed on an inner surface of the annular body such that, when a pressure of the sealant in the one or more chambers exceeds a threshold, the one or more dispensing portions are configured to rupture before the other portions to direct sealant from the one or more chambers toward the central opening.

(20) A kit comprising a washer comprising an annular body having a central opening and defining one or more chambers around the central opening, the one or more chambers containing a sealant, and the annular body having one or more dispensing portions that are weaker than other portions of the annular body, the one or more dispensing portions disposed on an inner surface of the annular body such that, when a pressure of the sealant in the one or more chambers exceeds a threshold, the one or more dispensing portions are configured to rupture before the other portions to direct sealant from the one or more chambers toward the central opening; a first fastener comprising a head comprising an upper side and a lower side, the upper side of the head having one or more surfaces that define a connector engage with a corresponding service portion configured to engage a second fastener and the lower side of the head having an annular surface that defines a recess adapted to receive a portion of the washer; and a shaft extending from the lower side of the head; a second fastener comprising a head comprising an upper side and a lower side; and a shaft extending from the lower side of the head and adapted to extend into the connector portion of the head of the first fastener to secure the second fastener relative to the first fastener; and a mounting bracket having an opening, the mounting bracket adapted to be disposed between the head of the first fastener and the head of the second fastener such that the shaft of the second fastener extends through the opening in the mounting bracket.

(21) A mounting assembly coupled to a mounting surface having a mounting aperture, the mounting assembly comprising a first fastener comprising a first head; and a first shaft extending from the first head into the mounting aperture of the mounting surface; and a sealing washer disposed around the first shaft of the first fastener between the mounting surface and the first head of the first fastener, the sealing washer defining one or more chambers adapted to contain a sealant, the one or more chambers comprising a frangible dispensing portion configured to rupture when a pressure of the sealant in the one or more chambers exceeds a threshold, the frangible dispensing portion configured to direct the sealant toward the first shaft of the first fastener upon rupture; and a mounting bracket comprising an opening through which the first shaft extends.

(22) The mounting assembly of (21), in combination with any of the preceding claims.

(23) A mounting assembly coupled to a mounting surface having a mounting, aperture, the mounting assembly comprising a first fastener comprising a first head comprising an upper side and a lower side, the upper side of the head having one or more surfaces that define a connector portion; and a first shaft extending from the lower side of the first head into the mounting aperture of the mounting surface; a second fastener engaging the connector portion of the first fastener, the second fastener comprising a second head comprising an upper side and a lower side; and a second shaft extending from the lower side of the second head into the connector portion of the first head of the first fastener to secure the second fastener relative to the first fastener; and a mounting bracket disposed between the first head of the first fastener and the second head of the second fastener such that the second shaft of the second fastener extends through an opening in the mounting bracket.

(24) The assembly of (23), in combination with any of the preceding claims.

(25) An anchor point device, comprising flashing, wherein the flashing is layered within roofing material on a roof; a structural mounting bracket coupled to the flashing, wherein the structural mounting bracket includes a run-off guard configured to be a levee against water flow down a slope of the roof; a sealing gasket fully encompassing a threaded anchor, wherein the threaded anchor applies a pre-load to the structural mounting bracket; and a liquid adhesive sealant disposed under on the flashing, wherein the liquid adhesive sealant bonds the flashing to the roofing material.

What is claimed is:

1. A mounting assembly coupled to a mounting surface having a mounting aperture, the mounting assembly comprising:
   a first fastener comprising:
   a first head comprising an upper side and a lower side, the upper side of the head having one or more surfaces that define a connector portion; and
   a first shaft extending from the lower side of the first head into the mounting aperture of the mounting surface;
   a sealing washer disposed around the first shaft of the first fastener between the mounting surface and the lower side of the first head of the first fastener, the sealing washer defining one or more chambers that contain a sealant, the one or more chambers comprising a frangible dispensing portion configured to rupture when a pressure of the sealant in the chamber exceeds a threshold, the frangible dispensing portion configured to direct the sealant toward the first shaft of the first fastener upon rupture;
   a second fastener engaging the connector portion of the first fastener, the second fastener comprising:
   a second head comprising an upper side and a lower side; and
   a second shaft extending from the lower side of the second head into the connector portion of the first head of the first fastener to secure the second fastener relative to the first fastener; and
   a mounting bracket disposed between the first head of the first fastener and the second head of the second fastener such that the second shaft of the second fastener extends through an opening in the mounting bracket,
   wherein a bottom face of the mounting bracket defines a first cavity corresponding shaped with and receiving the first head of the first fastener such that the first head seats within the first cavity with the lower side of the first fastener head flush with the bottom face of the mounting bracket and wherein the lower side of the first fastener head defines a second cavity receiving a portion of the sealing washer.

2. The mounting assembly of claim 1, further comprising:
   a flashing disposed between the sealing washer and the mounting surface, wherein the first shaft of the first fastener extends through flashing.

3. The mounting assembly of claim 2, wherein the sealant has been directed onto the first shaft of the first fastener and the flashing.

4. The mounting assembly of claim 1, further comprising:
   a fixture disposed atop the mounting surface, wherein the mounting bracket is coupled to the fixture.

5. The mounting assembly of claim 4, wherein the fixture comprises a rail.

6. The mounting assembly of claim 5 wherein a solar module is coupled to the rail.

7. The mounting assembly of claim 1, wherein the upper side of the second head of the second fastener comprises one or more surfaces that define a non-circular profile configured to be engaged by a corresponding profile of a tool to drive the second fastener.

8. The mounting assembly of claim 1, wherein each of the one or more chambers of the sealing washer includes a corresponding dispensing portion disposed on an interior circumference of the sealing washer.

9. The mounting assembly of claim 1, wherein the sealant comprises silicone.

10. A mounting assembly coupled to a mounting surface having a mounting aperture, the mounting assembly comprising:
    a first fastener comprising:
    a first head comprising an upper side and a lower side, the upper side of the head having one or more surfaces that define a connector portion; and
    a first shaft extending from the lower side of the first head into the mounting aperture of the mounting surface;
    a second fastener engaging the connector portion of the first fastener, the second fastener comprising:
    a second head comprising an upper side and a lower side; and
    a second shaft extending from the lower side of the second head into the connector portion of the first head of the first fastener to secure the second fastener relative to the first fastener;
    a mounting bracket disposed between the first head of the first fastener and the second head of the second fastener such that the second shaft of the second fastener extends through an opening in the mounting bracket;
    a sealing washer disposed around the first shaft of the first fastener between the mounting surface and the lower side of the first head of the first fastener, the sealing washer defining separate chambers that contain a sealant, the separate chambers each comprising a frangible dispensing portion configured to rupture when a pressure of the sealant in the chamber exceeds a threshold, the frangible dispensing portion configured to direct the sealant toward the first shaft of the first fastener upon rupture; and a flashing disposed between the sealing washer and the mounting surface, wherein the first shaft of the first fastener extends through flashing, wherein a bottom face of the mounting bracket defines a first cavity corresponding shaped with and receiving the first head of the first fastener such that the first head seats within the first cavity with the lower side of the first fastener head flush with the bottom face of the mounting bracket, and wherein the lower side of the first fastener head defines a second cavity receiving a portion of the sealing washer.

11. The mounting assembly of claim 10, wherein the sealant has been directed onto the first shaft of the first fastener and the flashing.

12. The mounting assembly of claim 10, further comprising:

a fixture disposed atop the mounting surface, wherein the mounting bracket is coupled to the fixture.

13. The mounting assembly of claim 12, wherein the fixture comprises a rail.

14. The mounting assembly of claim 13, wherein a solar module is coupled to the rail.

15. The mounting assembly of claim 10, wherein the upper side of the second head of the second fastener comprises one or more surfaces that define a non-circular profile configured to be engaged by a corresponding profile of a tool to drive the second fastener, and wherein each of the separate chambers of the sealing washer includes a corresponding dispensing portion disposed on an interior circumference of the sealing washer, wherein the sealant comprises silicone.

16. The mounting assembly of claim 10, wherein each of the separate chambers of the washer includes a curved top surface and a curved bottom surface.

* * * * *